United States Patent [19]

Bachman et al.

[11] Patent Number: 4,633,252

[45] Date of Patent: Dec. 30, 1986

[54] RADAR VELOCITY SENSOR

[75] Inventors: Wesley J. Bachman, Auburn; Steven G. Stone, Girard, both of Ill.

[73] Assignee: Dickey-john Corporation, Auburn, Ill.

[21] Appl. No.: 527,001

[22] Filed: Aug. 29, 1983

[51] Int. Cl.[4] ............................................. G01S 13/62
[52] U.S. Cl. ...................................... 342/99; 342/115
[58] Field of Search ............... 343/7 VM, 7 A, 65 LC, 343/7 ED, 8, 6.5 SS

[56] References Cited

U.S. PATENT DOCUMENTS

| | | | |
|---|---|---|---|
| 3,094,693 | 6/1963 | Taylor | 343/7 VM |
| 4,231,039 | 10/1980 | Fritzlen et al. | 343/7 PL X |
| 4,236,140 | 11/1980 | Aker et al. | 343/50 PX |
| 4,335,382 | 6/1982 | Brown et al. | 343/8 |

FOREIGN PATENT DOCUMENTS 1468159  3/1977  United Kingdom ................... 343/8

OTHER PUBLICATIONS

Skolnik, Introduction to Radar Systems, 1980, pp. 74–75, McGraw Hill.

Primary Examiner—T. H. Tubbesing
Assistant Examiner—Mark Hellner
Attorney, Agent, or Firm—Trexler, Bushnell & Wolters, Ltd.

[57] ABSTRACT

A tracking, variable Q bandpass filtering method and apparatus are provided for processing an IF signal from a radar transceiver or the like. The method comprises developing a digital period signal corresponding to the period of each of selected cycles of the IF signal; subjecting the digital period signal to low pass filtering; and controlling the effective corner frequency of the low pass filtering in accordance with the amount of variation in the digital period signal from one selected cycle to a successive selected cycle for producing a filtered signal which substantially follows the digital period signal, thereby substantially simultaneously tracking and filtering the IF signal. The apparatus comprises apparatus for carrying out the foregoing method. Preferably, the apparatus also includes an output switching control for selectively delivering or withholding the filtered signal from an output utilization device. This control is responsive to a predetermined control signal for withholding the filtered signal from the output utilization device. Preferably, the apparatus also includes a switchable power supply for the radar transceiver and a control circuit responsive to a predetermined control signal for switching the switchable power supply means to an inactive condition, thereby removing power from the radar transceiver.

27 Claims, 5 Drawing Figures

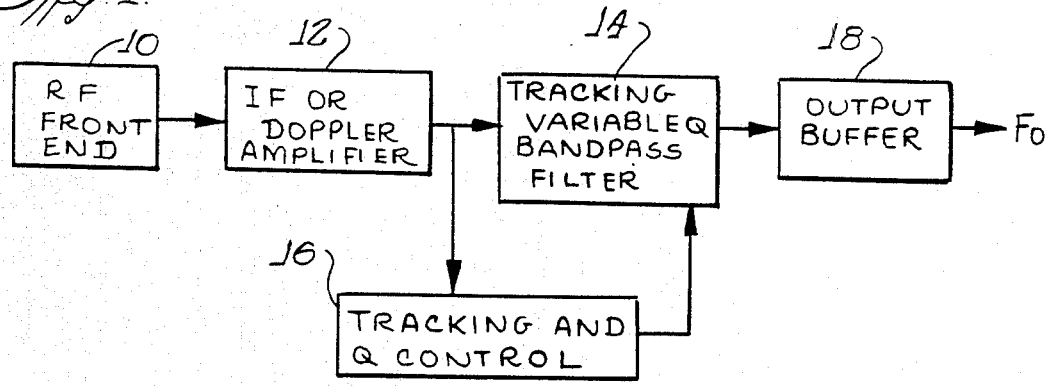
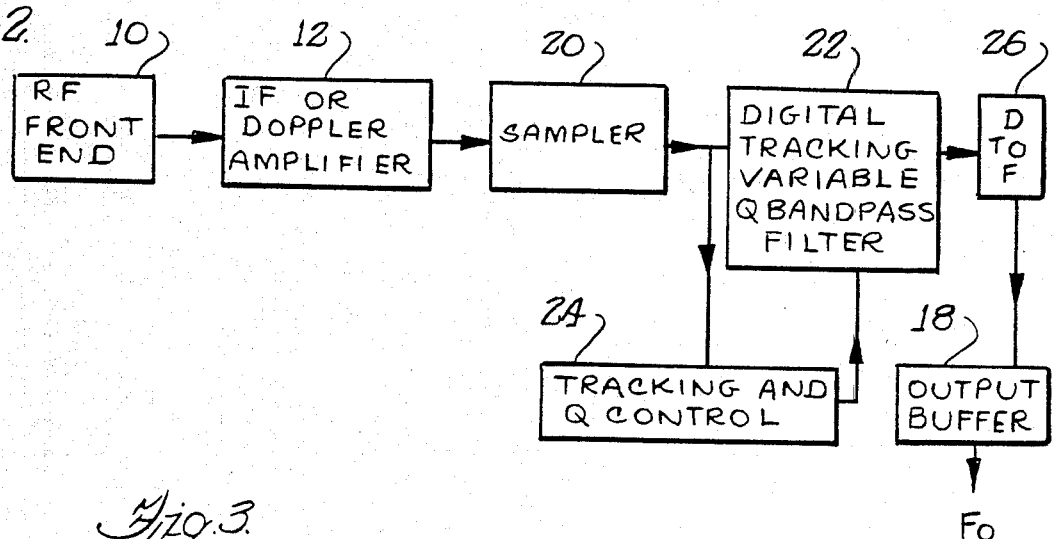
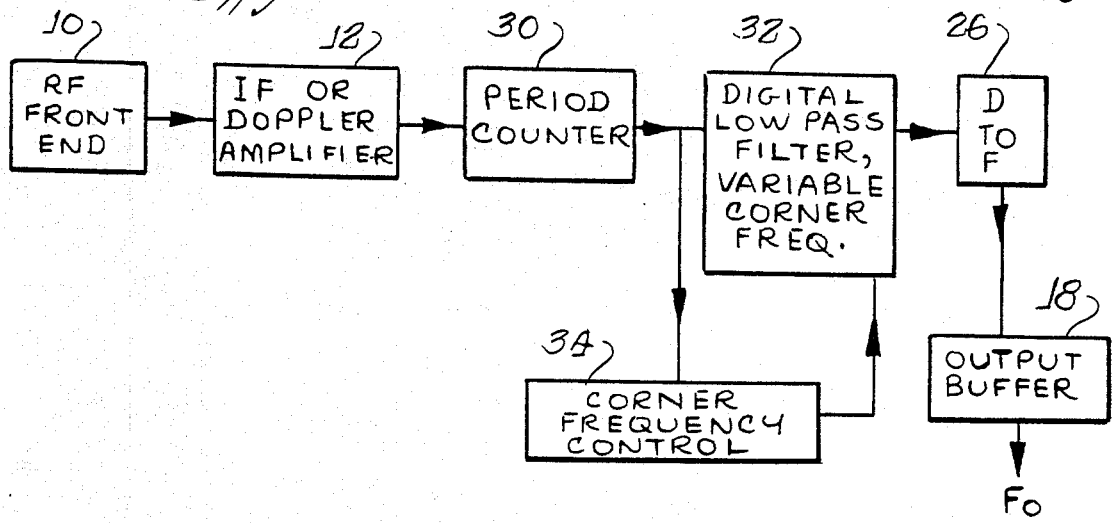

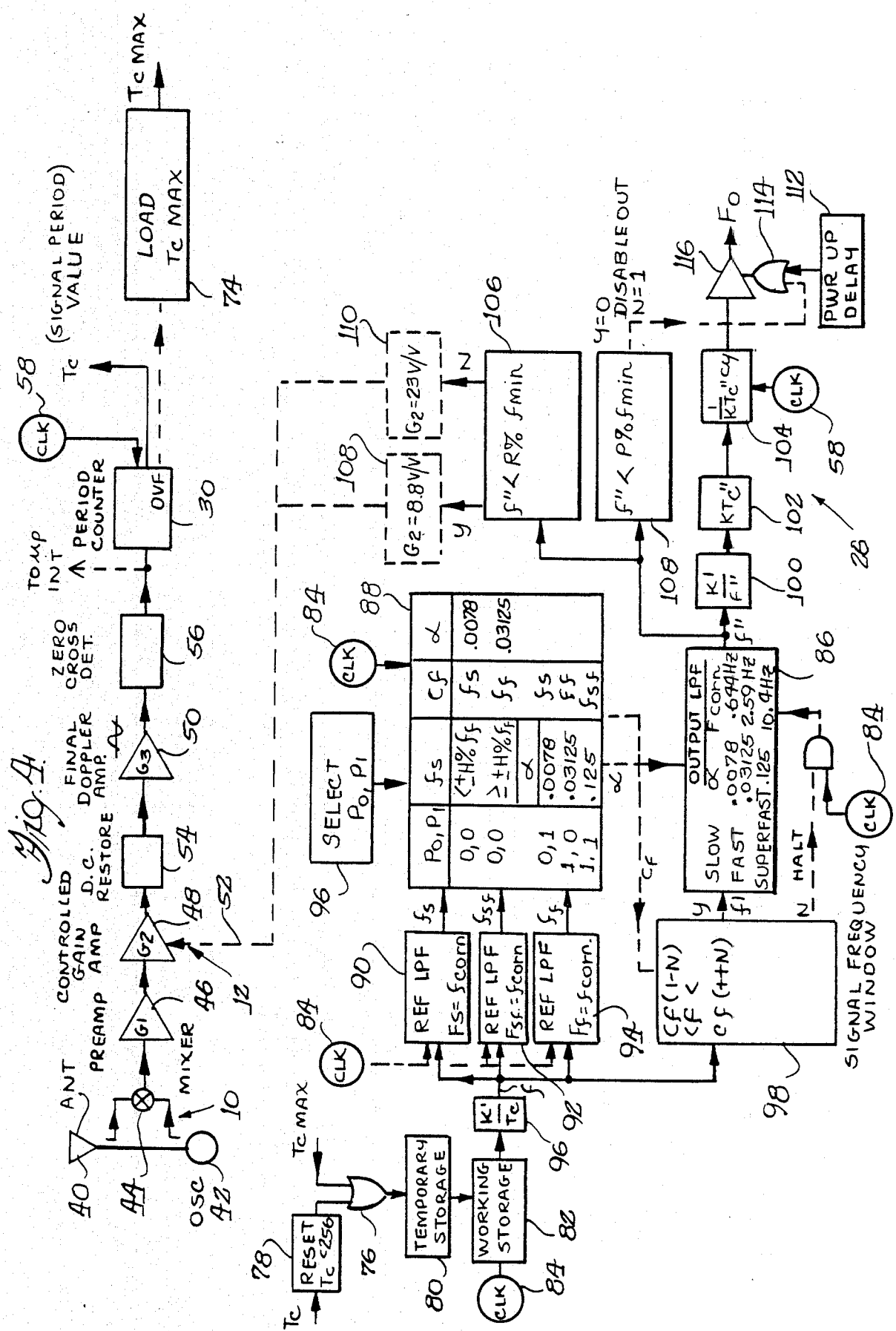

RADAR VELOCITY SENSOR

BACKGROUND OF THE INVENTION

The present invention is directed generally to the signal processing arts and more particularly to a novel and improved signal processing method and apparatus for use with a radar transceiver and associated circuitry for determining the velocity of a vehicle.

The prior art has proposed a number of radar-based systems for determining the velocity of a vehicle. Such systems are generally directed to the problem of monitoring the horizontal velocity of a vehicle travelling along a ground surface. Such radar speed monitors may be suitable for use from a fixed location in monitoring the speed of passing vehicles or alternatively, mounted upon the vehicle itself for monitoring of the speed thereof by an operator or driver of the vehicle.

The latter type of velocity monitor is particularly useful with respect to off-road vehicles, or farm implements, such as tractors or the like. In such vehicles, axle-mountd or other traditional velocity monitoring devices may become unreliable and/or inaccurate due to frequently encountered wheel slippage conditions in off road operation. Also, uneven ground conditions may add substantial vertical velocity components which tend to interfere with accurate speed measurement. Additionally, compaction of the wheels during operation, or changing of wheel sizes due to wear, or replacement thereof over a period of time will result in a change in the effective diameter of the wheel, whereby conventional wheel-shaft or drive-train based rotation responsive speed monitoring apparatus may prove inaccurate in operation. Radar-based velocity monitoring apparatus has been heretofore proposed for overcoming these problems.

One such radar-based velocity monitoring system for a tractor is shown for example in Fathauer et al U.S. Pat. No. 3,895,384. While this monitoring apparatus has found widespread acceptance, there is room for further improvement.

In particular, such a radar system generally uses a radar frequency transceiver comprising a radar oscillator, an antenna, local oscillator and mixer, to transmit and receive radar signals. The mixer operates to mix or multiply the received radar signal with the local oscillator signal so as to provide at least one difference component signal in an intermediate frequency (IF) range, preferably in the kilohertz range, suitable for further processing by conventional electronic circuit components. In this regard, the operation is analogous to that of conventional radio transmission involving a carrier wave similar to the transmitted radar signal and a signal component carried upon the carrier wave which is analogous generally to the Doppler shift or frequency variation in the received radar signal. Hence, only this difference is of interest in determining the corresponding horizontal velocity component of the vehicle.

As in all such radar and/or radio apparatus, various harmonic signal components, spurious signals and/or noise signals in general can interfere with proper operation of the circuit and ultimately with the correct determination of the speed of the vehicle. Accordingly, filtering is often utilized to limit the following processing circuits to substantially only the frequencies of interest, that is, the range of frequency variations expected in response to the expected range of vehicle velocities. In this regard, such off-road vehicles may be operated in a range of speeds from on the order of fractional miles per hour to on the order of tens of miles per hour.

Additionally, it is often desirable to shut off the radar antenna portion of the system when the vehicle is not in actual use in the field, or under other conditions. For example, when the vehicle is not in use, it may be considered desirable to minimize production of microwave radiation from the radar antenna. This may be true in the event of replacement, repair or repositioning of the antenna or other parts of the radar apparatus or of components of the vehicle which are located near the antenna.

Additionally, it is often desirable to cut off the velocity monitoring function of such a system at relatively low vehicle speeds or when the vehicle is standing still. This avoids possible false response of the system to spurious horizontal velocity signals which may be generated when standing still, for example, by other moving objects within the range of the radar antenna. It will be understood that when the vehicle is in motion, the present invention is such that other such velocity components will be substantially rejected in arriving at the correct velocity indication. However, with the vehicle standing still, such relative movement in the field of the radar may under some circumstances be indistinguishable from movement of the vehicle. Accordingly, it is desirable to at least prevent a velocity signal so generated from reaching the display components of the system, and moreover from reaching any further control apparatus which may operate a further implement in response to the velocity signal output of the monitor.

In order to substantially limit the response of the processing circuits to the signals of interest corresponding to the expected range of speeds, a bandpass filtering circuit is generally utilized. Moreover, in order to further limit the response of the system and reject a maximum amount of spurious, harmonic or noise signals, it is often the practice to operate this bandpass filter in a band considerably narrower than the expected range of speed variations. This is facilitated by utilizing tracking control which varies the center frequency of the relatively narrow bandpass to generally follow the frequency of interest in the incoming signal. This further requires circuitry to accurately detect and identify this frequency of interest or fundamental frequency of the incoming signal.

Additionally, some control over the bandwidth of the bandpass filter is generally considered desirable in order to continue to accurately track changing incoming velocity signals, over a range of frequencies which may vary with changing velocity of the vehicle. That is, the bandwidth should be broad enough, when required, to follow relatively rapid vehicle acceleration or deceleration and the attendant relatively rapidly changing doppler frequencies resulting therefrom. On the other hand, during periods of relatively stable or constant velocity operation, the bandwidth should preferably be kept relatively narrow to maximize spurious and noise signal rejection. However, conventional prior art analog bandpass filtering, tracking and variable bandwidth or Q control circuits are relatively complex and expensive.

The prior art has proposed replacing such complex and expensive analog circuits with equivalent digital circuits, which perform essentially equivalent bandpass filtering, tracking and Q control functions in a digital form, generally utilizing digital computer or processor components. Briefly, the computer model for a digital bandpass filter including variable tracking and Q control involves selecting a sampling rate at least as great as the highest frequency expected to be encountered in the signal of interest. This computer implementation also involves the computation of a plurality of mathematical transformation functions which becomes relatively complex.

As a result, operating at a sufficiently high rate of speed to accurately sample and filter a sinusoidal signal of a frequency of on the order of even one or two kilohertz requires a surprisingly large amount of computing power. This is true because of the large number of computations which must be performed with respect to each sample and the relatively high sampling rate at which such samples must be processed in order to adequately follow the incoming signal. Accordingly, relatively inexpensive single-chip microcomputer or microprocessor components which are generally available fall far short in terms of computing power of the requirements for such implementation of tracking bandpass filtering. Accordingly, it was heretofore believed that implementation of adequate bandpass filtering, including tracking and Q control in such a system would require relatively complex and expensive analog components, or alternatively, a digital computer system much too complex and expensive to be economically utilized in a typical off road vehicle or farm tractor application.

OBJECTS OF THE INVENTION

Accordingly, it is a general object of the invention to provide a novel and improved radar-based velocity sensor for a vehicle.

A more particular object is to provide such a velocity sensor which utilizes a tracking and Q-controlled bandpass filter, which may surprisingly be constructed from relatively simple and inexpensive electronic circuit components, thus avoiding the excessive expense of prior art circuits of this type.

A related object is to provide a signal processing circuit for a velocity monitor of the foregoing type which may readily be coupled with existing apparatus to accommodate display or other utilization of the monitored vehicle velocity information.

A further object is to provide a monitoring system which is capable of interrupting the power supply to the radar transceiver whenever desired.

A related object is to provide a velocity monitoring system of the foregoing type which is further capable of cutting off the velocity output signal to the display or other utilization apparatus whenever desired.

A related object is to provide a radar-based velocity monitoring apparatus in accordance with the foregoing objects which is relatively simple and inexpensive in its design and manufacture and yet highly reliable in operation.

BRIEF DESCRIPTION OF THE DRAWINGS

The foregoing, as well as other objects, features and advantages of the invention will become more apparent upon consideration of the following detailed description of the illustrated embodiment, together with the accompanying drawings, wherein:

FIG. 1 is a block diagram of a radar-based velocity monitoring system utilizing signal processing components in accordance with conventional theory;

FIG. 2 is a block diagram of a second radar-based velocity monitoring system utilizing a second form of signal processing components in accordance with conventional theory;

FIG. 3 is a block diagram of a radar-based velocity monitoring system constructed in accordance with the principles of the present invention;

FIG. 4 is a block schematic diagram, partially in functional form, illustrating the operation of a radar-based velocity monitoring system in accordance with the invention.

DETAILED DESCRIPTION OF THE ILLUSTRATED EMBODIMENT

Figure 5:
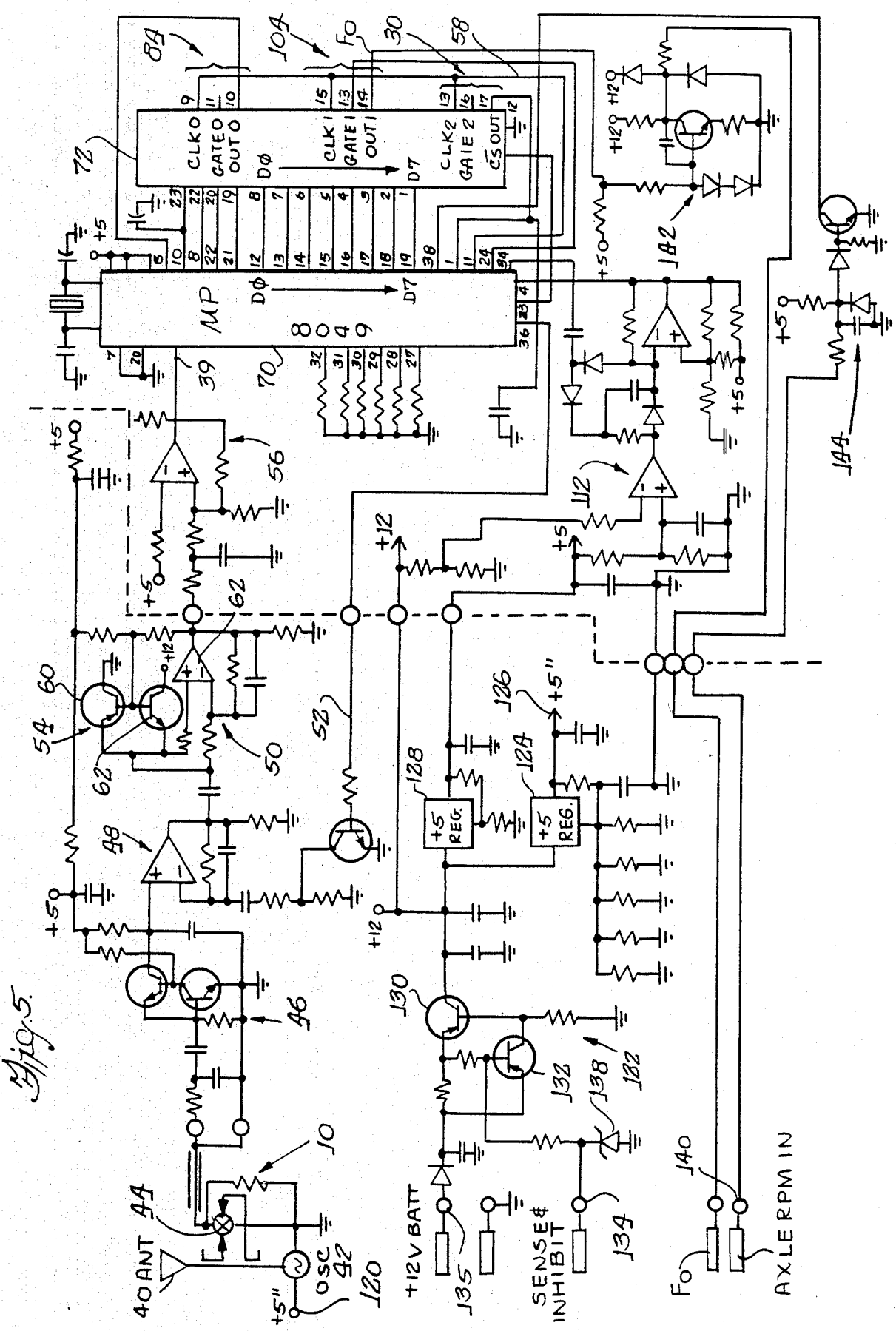
FIG. 5 is a schematic circuit diagram illustrating a radar-based velocity monitoring system in accordance with the invention.

The present invention is directed to a novel signal processing system for achieving a tracking, variable Q bandpass filtering function, useful in many applications. The disclosed system is particularly useful in applications where a relatively limited and preferably primarily sinusoidal signal variation comprises the signal of interest to be followed. That is, the system of the invention is particularly effective in providing an equivalent function to a tracking, variable Q bandpass filter for non-complex signals in the kilocycle range. One such application is in tracking and filtering the Doppler shift frequencies of a Doppler radar transceiver. Hence, while the invention is not limited thereto, the following discussion will be directed to such a Doppler transceiver system.

Referring now to the drawings and initially to FIG. 1, a typical prior art radar velocity system includes a radar frequency (RF) front end 10. Generally speaking, such a "front end" includes suitable radar transceiver and antenna for both generating and receiving back radar signals. The received radar signals will then be doppler shifted in accordance with well-known theory, as compared with the originally transmitted radar signals.

To this end a further suitable local oscillator and mixer (not shown) also comprising a part of the RF front end 10 are utilized to produce a suitable intermediate frequency (IF) for further processing by conventional circuit components. In this regard, the IF frequency produced by the local oscillator and mixer is preferably in the kilocycle range. Hence, an IF or doppler amplifier 12 is provided for receiving this IF signal.

Further in accordance with prior art practice, a suitable tracking, variable Q bandpass filter 14 may be provided for tracking and filtering the output of the IF amplifier 12. Here, various spurious signals, noise, harmonics or signals due to vertical velocity components or "bumps" may be eliminated from the signal of interest corresponding to horizontal velocity by proper filter design.

In this regard, it is desirable to provide a bandpass filter which has a variable Q or bandwidth so as to reject signals outside of a relatively narrow band of frequencies expected from the IF amplifier in response to the expected range of vehicle velocities. However, the Q or bandwidth of the filter must also be sufficiently broad to accommodate the maximum frequency changes or variations produced in response to maximum expected vehicle accelerations. In this regard, tracking and Q control circuits 16 are provided for the filter 14. The resulting filter output signals from the filter 14 may then be fed by way of a suitable output circuit or buffer 18 as a signal Fo to a suitable display or other utilization device (not shown) as desired. As previously indicated, the realization of such tracking, variable Q bandpass filters, and suitable tracking and Q control components in analog form requires relatively complex and expensive circuits.

Referring to FIG. 2, the bandpass filter and tracking and Q control may also be realized in digital form, utilizing suitable computer or processor components. In this regard, the circuit of FIG. 2 includes a similar RF front end 10 and IF or doppler amplifier 12. Departing from the circuit of FIG. 1, the filter 14 is replaced by an equivalent digital filter 22. Accordingly, a suitable sampler circuit 20 is interposed between the IF amplifier and the digital tracking variable Q band pass filter 22. In accordance with conventional digital filter theory, the sampling rate of the sampler circuit 20 must be greater than the maximum frequency expected from the IF amplifier 12. That is, the rate of sampling of the sampler 20 must be sufficient to provide a reasonably accurate representation of all changes in this frequency 12, and hence must be sufficiently rapid to accommodate the maximum rate of change expected in response to maximum vehicle acceleration.

A suitable digital tracking and Q control circuitry 24 is similarly provided for the digital filter 22, and is generally interposed intermediate the sampler 20 and an appropriate control input of the digital filter 22. Additionally, some suitable digital-to-analog or digital-to-frequency (D to F) output converting circuit 26 is also preferably interposed ahead of the conventional output buffer 18 for converting the digital output of the digital filter 22 to a frequency signal Fo suitable for use by the following display or other utilization circuits (not shown).

As previously mentioned, the computer model for a digital bandpass filter including tracking and Q control involves the computation of a plurality of mathematical transformation functions which become relatively complex. With the addition of a relatively high sampling rate at the sampler 20 and the requirement of correspondingly relatively rapid and frequent computations to accommodate both the bandpass filter 22 and the tracking and Q control 24, the computing power requirements of such a computer model becomes surprisingly great. In this regard, the requirements of computing power to achieve the digital filter circuits of FIG. 2 are considerably greater than that available on relatively inexpensive single-chip microcomputer or microprocessor components.

Referring now to FIG. 3, in accordance with the invention, it has been found that the equivalent functions of the relatively expensive circuitry of FIGS. 1 and 2, may be performed by an alternative arrangement of relatively simple and inexpensive digital circuit components in accordance with the principles of the invention.

In this regard, the radar system of FIG. 3 comprises a similar RF front end 10 and IF amplifier 12 to those already described with reference to FIGS. 1 and 2. Departing from convention, a period counter 30 is provided for producing a digital period signal corresponding to the period of at least selected cycles of the output signal of the IF amplifier 12. The output digital period signal of this period counter is fed to a digital low pass filter 32 which has a variable corner frequency. The output of the period counter 30 is also fed to a suitable corner frequency control circuit 34 for selectively controllably varying the variable corner frequency of the digital low pass filter 32.

As will become more apparent upon reading the ensuing description, the foregoing circuitry comprising the period counter, digital variable corner frequency low pass filter 32 and the corner frequency control circuits 34 may surprisingly be realized in the form of relatively simple and inexpensive digital circuits and microcomputer or microprocessor components, contrary to the prior art systems illustrated and described above with reference to FIG. 1 and FIG. 2. The resultant output of the digital low pass filter 32 is fed to a similar D to F converter circuit 26 and a suitable output buffer 18 for producing a suitable frequency signal Fo for driving a conventional display or other utilization apparatus (not shown).

Briefly, it has been found that for use with a limited range of IF frequencies, for example as expected in doppler radar-velocity monitoring of off-road type vehicles, the system of FIG. 3 may be inexpensively realized in conventional single-chip microcomputer or microprocessor components, without exceeding the limited computing power currently available in such components. In operation, it is believed that the period counter 30 operates upon the IF signal to essentially eliminate or convert the frequency components thereof to a series of relatively simple, discrete digital signals. Hence, filtering can proceed on a relatively simplified basis, with attention only to variations between discrete digital signals, rather than the more demanding functions of following and digital reconstruction of a continuous frequency signal. These variations will correspond to variations in the incoming IF signal about its nominal center frequency or fundamental frequency due to the vehicle velocity.

Moreover, in view of the relatively limited range of velocities, as well as limited maximum acceleration expected with such an off-road or farm tractor type of vehicle, the sampling rate of the period counter 30 and of the digital low pass filter 32 need not be particularly great to accurately track or follow the signals of interest.

Additionally, as will presently be seen, it has been found that a relatively simple and yet effective corner frequency control can be further simplified, so as to require the selection of only two or three different effective corner frequencies for the digital low pass filter 32. Hence, one relatively low corner frequency may be selected to effectively limit the effective filter bandwidth when the vehicle is being operated at a relatively steady or constant velocity. On the other hand, a relatively greater corner frequency may be selected for use when the vehicle velocity is changing due to vehicle acceleration or deceleration.

Moreover, it will be seen that the utilization of the period counter 30, digital low pass filter with variable corner frequency 32 and the corner frequency control 34 automatically achieve the tracking function of the bandpass filtering components of the prior art in accordance with FIGS. 1 and 2 as described above. This occurs due to the sampling of discrete digital period samples and to the selection of a suitable effective low pass corner in accordance with variations from sample to sample.

Stated another way, by comparison to conventional radio receiver apparatus, the period counter 30 functions in the manner of a mixer tuned to the IF frequency. That is, the IF frequency component from the IF or doppler amplifier 12 is thereby multiplied substantially by itself and hence cancelled from the difference component. Accordingly, all that remains is the signal component of interest, that is, the doppler shift or variation or frequency signals. As frequency signals, these can clearly have only positive values, thus existing only to one side of the nominal zero or IF frequency. Moreover, in view of the limited range of velocities of the vehicle being monitored, these doppler shift variations are all within a relatively small range of frequencies above the now effectively "zero" IF frequency. Accordingly, a low pass filter may now be utilized to effectively filter these remaining variation frequency components, which have essentially been converted from the time domain to the frequency domain by use of the period counter 30.

From the foregoing, it will now be appreciated that control of the corner frequency by circuit 34 together with the function of the period counter 30 effectively provides tracking of the IF signal and variations therein without the need for any separate tracking components or apparatus.

Referring now to FIG. 4, the operation of the system in accordance with the invention will be described in further detail. Reference is also invited to FIG. 5 which comprises a schematic circuit diagram of a preferred embodiment of a monitoring system which operates in accordance with the preceeding discussion and in accordance with the functional aspects of FIG. 4 to be next discussed.

As previously mentioned, a suitable radar frequency (RF) front end comprises a suitable antenna 40 for both transmitting and receiving the radar frequency signals. To this end a suitable oscillator 42 and mixer 44, for example in the form of Gunn oscillator and mixer diodes, are utilized. The incoming signals from the mixer are fed to a suitable IF amplifying circuitry 12 which preferably includes a suitable preamplifier 46 having a gain factor G1, and second amplifier 48 having a gain G2 and a final doppler amplifier 50 having a gain factor G3.

In accordance with a preferred form of the invention, the amplifier 48 may be provided with a variable gain control input, illustrated in phantom line at 52. Hence amplifier 48 is often referred hereinafter as a controlled gain amplifier. This variable gain control of amplifier 48 will be discussed later herein.

Further in accordance with a preferred form of the invention, the circuit 12 includes a DC restore circuit 54 interposed between respective amplifiers 48 and 50 which as will later be described, functions essentially as a high pass tracking filter. Following the final doppler amplifier 50 a suitable zero crossing detector 56 signals the period counter 30 at each zero crossing of the IF or doppler amplified signal from amplifier 50 so as to produce a digital period signal corresponding to the period of this IF or doppler signal. In this regard, a suitable high frequency clock, which in the illustrated embodiment provides a clock frequency of substantially 666.67 kilohertz is provided for the period counter 30.

In operation, the period counter functions to count the pulses from the clock 58 which occur between the zero crossings of the IF or doppler frequency signal as detected by the zero crossing detector 56. Accordingly, a period signal Tc is produced by the period counter 30 for substantially each cycle of the IF or doppler signal.

Referring briefly to FIG. 5, the foregoing circuitry is indicated in circuit schematic form. In this regard, it will be noted that the DC restore circuit 54 comprises a pair of bi-polar transistors 60, 62 of opposite polarity which are coupled in an essentially "back-to-back" configuration intermediate suitable DC levels (plus 5, plus 12 and ground in the illustrated embodiment), and one input of an operational amplifier (op amp) 62 which comprises the active component of the doppler amplifier 50. The other input of this op amp 62 receives the signal from the controlled gain amplifier 48. The transistors 60 and 62 will be seen to function essentially in the fashion of the back-to-back diodes illustrated and described in the previously mentioned U.S. patent to Fathauer and Bachman, U.S. Pat. No. 3,895,384. In this regard, this circuit configuration also effectively provides a tracking high pass filtering function, as it tends to limit the swing of the relatively low frequency variations of interest about the desired zero crossings thereof required for operation of the zero crossing detector 56. Such swings may occur due to high frequency components in the signal acting as a "carrier" for the low frequency components. Such high frequency signals might occur as "ringing" in response to rapid vertical velocity components, for example due to uneven ground surfaces, "bumps" or the like, or from other spurious or noise sources.

The remaining function of digital low pass variable corner frequency filter 32 and corner frequency control 34 are carried out in the present embodiment by a suitable microcomputer or microprocessor component 70. In accordance with the invention, it has been found that contrary to prior expectation, the required computing functions may be readily carried out by a relatively widely available and inexpensive single chip integrated circuit form of microprocessor 70. Accordingly, in the illustrated embodiment a microprocessor chip of the type generally designated 8049 is utilized.

Additional counting and clocking functions in conjunction with operation of microprocessor or processor 70 are carried out by a suitable integrated circuit multiple counter component 72. In the illustrated embodiment a counter component of the type generally designated 8253, which is a three-counter, processor-compatible integrated circuit chip, is utilized.

Referring now again to FIG. 4, the function of the processor and associated circuit components thus far described in achieving the novel digital filtering and tracking function in accordance with the present invention will next be discussed.

Initially, as a practical matter, some upper limit must be set upon the value of the output Tc of the period counter 30. Accordingly, a maximum period (Tc Max) detector is coupled to a suitable overflow (OVF) output of the counter 30 for outputting a suitable maximum digital period count (Tc Max) in response to "overflow" of the counter. It will be appreciated that a particularly low frequency input signal to the zero crossing detector 56 may result in such an "overflow" and hence maximum period count and the resultant production of a Tc Max signal.

The Tc and/or Tc Max counter 74 signals are then functionally processed by an equivalent OR circuit 76. Additionally a minimum Tc value to define a maximum frequency input to the zero crossing detector 56 is detected at a functional block 78. In the illustrated embodiment, this block essentially provides a reset in the event the period count Tc is less than or equal to 256.

It should be recognized that the function of OR gate 76 and minimum period detect and reset clock 78 are carried out by the microprocessor 70. In the same fashion the microprocesor 70 and/or counting circuit 72 carry out the functions of the period counter 30, clock 58, Tc Max detector 74 and the remaining functions of FIG. 4 to be described hereinafter.

The output of equivalent or block 76 is fed to a temporary storage register 80, which in turn feeds a working storage register 82. This working storage register 82 is in turn periodically sampled or clocked by a suitable sample clock 84 which in the illustrated embodiment is provided by one of the counting circuits of the integrated circuit 72 as indicated. In the illustrated embodiment, the frequency or rate of sampling of the sampling clock 84 is substantially 512 hertz.

Surprisingly, it has been found that this 512 hertz sampling rate is adequate to accurately follow or track the signals of interest in the illustrated embodiment. In this regard, the expected range of frequencies of the IF or doppler signals produced in response to a typical off road vehicle or farm tractor are from on the order of 10 hertz to on the order of 2600 hertz. Below the 10 hertz limit, the tractor or other vehicle is assumed to be essentially in a stationary condition, while such vehicles are generally not capable of speeds which would result in IF or doppler frequencies above the 2600 hertz level, with the doppler radar front end 10 utilized in the illustrated embodiment. In this regard, a suitable radar front end is more fully described, for example, in the above-referenced U.S. Pat. No. 3,895,384 and moreover, many suitable such radar devices are generally known in the art.

Morever, since the acceleration capacity of such off road vehicles generally decreases with increasing velocity, the variations in IF signal to be followed due to acceleration of the vehicle will generally become smaller as the frequency of the signal increases with velocity. Additionally, since a discreet, digital period count signal is now being sampled by the clock 84, it has been found that the 512 hertz sampling rate is more than adequate to accurately reflect any changes in the value of this period count from cycle to cycle. This is true even though the sampling rate may in fact be shorter than the period counter cycling rate, or zero crossing rate at some higher frequencies.

The foregoing will be more fully appreciated upon considering operation of the digital filtering function to be next discussed. A digital low pass filter functional block is indicated generally at reference numeral 86. This digital low pass filter generally functions to calculate and store a sample value of the incoming digital signal in accordance with a given transfer function. This transfer function sets the sample value equal to the sum of a first proportion of the previously stored sample value and a second proportion of the incoming digital signal value. This relationship may be stated as follows:

$$y(k) = \alpha u(k) + \beta y(k-1),$$

where $\beta = (1 - \alpha)$.

From the foregoing, it will be seen that the effective "corner frequency" of such a digital low pass filter may be set by varying the foregoing "alpha" factor or proportion to change the "weighting" of the incoming digital signal in calculating the sample value. The output of the digital low pass filter 86 then comprises the digital sample values "y" computed in this fashion. Hence, it will be seen that tracking of the input signal is accomplished at a greater or lesser rate, depending upon the value of the alpha factor or proportion. Moreover, the effective corner frequency, that is the ability of the filter 86 to "follow" variations in the incoming digital signal of more than a predetermined amount is also dependent upon this alpha factor or proportion. Accordingly, a suitable corner frequency or "alpha" factor selecting or control means is provided as indicated generally at functional block 88, which will be described next.

Surprisingly, it has been found that as few as two selectable effective corner frequencies of alpha factors for the digital low pass filter 86, are sufficient for adequate tracking and filtering in accordance with the present invention. However, we prefer to provide three such choices or selections of corner frequency or alpha factor. In order to select a given one of these corner frequencies or alpha factors at any given time, a set of reference filters functionally indicated at blocks 90, 92 and 94 are utilized. In the illustrated embodiment, reference filters 90, 92 and 94 comprise digital low pass filters. Additionally, the sampled period signals from working storage 82 is inverted or converted to frequency-like or frequency-related digital signals by a functional block 96. This inversion or conversion takes place prior to the feeding of a digital signal to the inputs of the respective digital low pass filter 86 and reference low pass filters 90, 92 and 94 which comprise the inputs to the corner frequency or alpha proportion or factor selection block 88.

This digital frequency-related signal (f) will be recognized to be a second digital value or signal provided at preselected periods in accordance with the sampling of the clock 84, which is also provided to suitable inputs of the reference low pass filters 90, 92 and 94. In operation, these reference low pass filters also comprise digital low pass filters as mentioned, and hence, also operate in accordance with the same transfer function given above. Hence, outputs of these filters comprise periodic sample values of the same form described above with reference to the digital low pass filter 86. However, the alpha factors or effective corner frequencies of each of these reference low pass filters 90, 92 and 94 is preselected rather than variable.

In the illustrated embodiment, reference filter 90 is designated as the slow filter and has an effective corner frequency (Fs) of on the order of 0.644 hertz. Similarly, the reference filter 94 has been designated as the fast filter and has a corner frequency (Ff) of on the order of 2.59 hertz. The third reference filter 92 is designated as the "super fast" filter and has a corner frequency (Fsf) of on the order of 10.4 hertz. In this regard, the alpha factor of the slow reference filter 90 which corresponds to the effective corner frequency of 0.644 hertz is on the order of 0.0078. Similarly, the alpha factor associated with reference filter 94 is on the order of 0.03125, while the alpha factor selected for filter 92 is on the order of 0.125. These effective corner frequencies and alpha factors were empirically selected.

In operation, an additional selection of a "processing mode" may be provided by a selection block 96 which provides a suitable control input to the corner frequency selection block 88. This selection control is in the form of a two-bit signal P0, P1, and the notations inside corner frequency selection block 88 indicate the response thereof to the possible values of this two bit signal.

In this regard, with P0, P1 selected as 0, 0, the control block 88 acts to compare the output of the slow reference filter 90 with the output of the fast reference filter 94. If the deviation between the values of these outputs is less than a given percentage (plus or minus H%) of the output of the fast reference filter 94, the selection or control block 88 selects the alpha factor 0.0078 of the slow reference filter as the alpha factor of the digital low pass filter 86. On the other hand, if the deviation between the outputs of the slow reference filter and of the fast reference filter 94 are greater than or equal to the same percentage (plus or minus H%), the control or selection block 88 selects the alpha factor 0.03125 of the fast reference filter 94 as the alpha factor for the digital low pass filter 86.

It will be appreciated with respect to the foregoing that with a relatively stable or slowly changing vehicle velocity, the sample values f at the output of block 96 will not be changing very rapidly. Accordingly, all three reference filters 90, 92 and 94 will tend to follow these values f, without much variation between their sample value outputs. Hence, a relatively narrow or low corner frequency, corresponding to a relatively "slow" filter (such as filter 90) will be adequate to follow the digital signal f under these circumstances. Accordingly, the effective corner frequency or alpha factor for digital low pass filter 86 is so selected under these circumstances.

On the other hand, when the velocity of the vehicle is changing fairly rapidly, the successive values of the digital signal f will also change at a somewhat greater rate. Accordingly, in view of the foregoing sampling and transfer function of the three reference filters 90, 92 and 94 it will be appreciated that their outputs will begin to diverge or deviate as the variations in the successive samples f at their inputs begins to vary more greatly. Accordingly, to more closely follow this now greater variation in the digital signal f, the digital low pass filter 86 must be a somewhat "faster" filter having a somewhat broader or higher corner frequency and hence larger alpha factor. Hence, the selection of so-called "slow" and "fast" filter characteristics for digital low pass filter 86 is accomplished by the corner frequency control means provided by block 88 and reference filters 90, 92 and 94.

In accordance with a preferred form of the invention an additional "signal frequency window" functional block 98 is also provided. This block 98 functions essentially to eliminate or reject any signals f which vary by more than a predetermined amount from previous signals f. Briefly, such variations would be indicative of velocity changes, and therefore accelerations greater than possible with the off-road vehicle or farm tractor being monitored. Hence, such signals would be indicative of spurious signal generation, noise, or vertical velocity components due to uneven ground surfaces, bumps, "ringing" of the circuits or the like. Additionally, elimination of digital signals which vary by more than a predetemined amount from previous signals help to eliminate the effects of the phenomenon of "aliasing" which is encountered in digital filtering theory. Briefly, this phenomenum refers to the tendency of digital filters operating in accordance with the above noted transfer function to pass not only frequencies within their nominal or equivalent pass band but also integral multiples or harmonics thereof. Hence, variations in the digital signal f which might result in any of the foregoing spurious or undesirable inputs to the digital low pass filter 86 are effectively eliminated by signal frequency window 98.

Briefly, the signal frequency window 98 operates to reject any signal f and thereby deliver as input f' to the digital filter 86 those signals which vary by less than a predetermined amount from a center frequency value cf based upon previous signals in the "train" of samples f. In this regard, a center frequency (cf) for this determination is also selected by the control and selection block 88. As indicated in block 88, this center frequency (cf) is selected as the output signal of one of the reference filters 90, 92 and 94 in accordance with generally the same criteria as discussed above for the selection of the alpha value for digital low pass filter 86. Accordingly, both of these selections or control functions are accomplished simultaneously in accordance with the results of the reference filtering described above. A suitable "halt" control line feeds an equivalent AND gate together with sample clock 84 to prevent operation of digital low pass filter 86 in response to any signal rejected by the window 98.

The output of the digital low pass filter 86 is designated as f" and is fed through suitable output D to F conversion 26 comprising blocks 100, 102 and 104 for conversion back to an equivalent frequency signal F0 suitable for use with existing display and other utilization circuits. As previously mentioned, the f" signal may also be utilized to control the gain factor G2 of amplifier 48 by way of control line 52. In this regard, if the resultant output signal f" is less than a given percentage R of the minimum frequency (fmin) of the system, which will be remembered to be on the order of 10.17 hertz, a first gain factor G2 is selected for the amplifier 48. In the illustrated embodiment the percentage R is 737 and the gain factor G2 selected when f" is less than this percentage of fmin is 8.8 volts per volt. Otherwise, a gain factor G2 of 23 volts per volt is selected. At the same time, the output f0 is also preferably disabled by a block 108 if f" is less than a second percentage P of fmin. In the illustrated embodiment, P is selected as 147.

The 666.67 KHz, clock 58 feeds the last "frequency conversion" or output counter block 104. An additional output buffer 116 is inserted after this block 104 and receives a suitable control signal from block 108 by way of an OR function indicated at 114. A suitable "power-up" delay or control circuit 112 also feeds into this OR functional block 114.

Other constants selected in the illustrated embodiment are as follows:

K' is selected as $2^{23}$, N is selected as 0.25, G1 is selected as 40 volts per volt, G3 is selected as 10 volts per volt.

Referring again to FIG. 5, additional circuitry is added in accordance with a preferred form of the invention to accommodate two further preferred features. As previously indicated, under some circumstances it is desirable to disable either the radar unit 10 itself or at least to disable the output thereof to prevent response thereto by a display or other utilization devices.

In the former regard, a suitable positive voltage supply of on the order of plus 5 volts DC is provided to the radar apparatus including oscillator 42 as indicated generally at reference numeral 120. This positive 5 volt supply is preferably provided by a power supply circuit designated generally by reference numeral 122 and including a 5 volt integrated circuit voltage regulator component which provides the positive 5 volts DC to input 120 at a corresponding output 126 thereof. This and a further similar 5 volt regulator 128 are coupled to a suitable power source such as a positive 12 volt vehicle battery by way of a switching circuit comprising a pair of switching transistors 130 and 132. A suitable "sense and inhibit" control input 134 is provided for receiving a suitable control input signal for controlling the switching of these transistors 130, 132 and thereby controlling powering up of the regulators 124 and 128 from the 12 volt battery at input terminal 135. In the illustrated embodiment, it will be seen that a suitable zener reference level is provided by a zener diode 138 and the sense and inhibit input signal at 134 feeds the base electrode of switching transistor 132 which, like transistor 130, is a PNP transistor in the illustrated embodiment.

The appropriate "sense and inhibit" control signal for switching transistors 130 and 132 so as to effectively disable the power supply to the radar apparatus 10 may be provided in response to any selected condition, for example by sensing this condition through a suitable sensor and providing a suitable control signal. Such may be a function of the microprocessor 70 if desired, or of a further control circuit or even a second processor or the like associated with another piece of equipment, for example, some implement or machinery being pulled by the tractor.

As previously indicated, it is often desirable to effectively disable or turn off the radar components 10 when the vehicle is not in motion to generally prevent response thereof to spurious signals due to movement of objects within the range of the antenna 40. Additionally, it may be desirable to eliminate microwave radiations from the area about radar antenna 40 while various repairs or other activities are taking place in this area. Accordingly, a suitable simple go/no go axle rotation sensor might be utilized at the "sense and inhibit" input 134. Additionally, the "f minimum" value discussed above, when detected by the processor 70, might be utilized for this function.

Similarly, such minimum velocity determined by way of a simple axle rotation sensor or alternatively by the processor 70 may be utilized as a control signal at an "axle RPM in" input 140 to inhibit the velocity output signal frequency F0. In this regard, it is noted that this output signal is produced at an output terminal OUT 1 of a portion of counter 72 designated generally by reference numeral 104. This output is fed to a analog level control and conversion circuit 142. The axle RPM or other minimum velocity control signal at input 140 is fed through a suitable level conversion circuit 144 to a suitable control port (at pin 38) of the processor 70. Responsively, the processor 70 in turn controls operation of the counter 72 to inhibit the output of portion 104 in response to the minimum velocity control at input terminal 140.

As previously mentioned, this avoids possible incorrect response of a display or other utilization circuitry to spurious signals which might be generated while the vehicle is essentially standing still. As mentioned, under normal operation, the doppler radar signals representing horizontal velocity of the vehicle are readily separated from such spurious or noise signals. However, this is not always reliably accomplished when the vehicle is essentially standing still, as the only signals remaining to work upon may be such spurious or noise input signals.

Additional circuitry comprises a suitable power up delay or sequencing circuit 112 mentioned above for the microprocessor 70. This circuit is tied to the power supply circuits 122 to accomplish suitable memory protection and the like upon powering up and/or powering down of the circuits of FIG. 5. Additionally, the gain control line 52 feeds a suitable inverting input of an operational amplifier comprising the amplifier 48 by way of suitable intervening circuitry.

In order to fully describe the specific embodiment of the invention, the following pages contain a reproduction of a suitable software or programming for the microprocessor 70 in accordance with the foregoing description.

While the invention has been illustrated and described herein with reference to a particular embodiment, the invention is not limited thereto. Those skilled in the art may devise various changes, alternatives and modifications upon reading the foregoing description. The invention includes such changes, alternatives, and modifications insofar as they fall within the spirit and scope of the appended claims.

```
LOC  OBJ        LINE       SOURCE STATEMENT

1  $TITLE('THIS FILE ON DISK (R2010)-AUTHOR STEVEN STONE')
             2  ;
             3  ;
             4  ;THIS FILE HAS COUNTERS OF THE 8253 GETTING A NEW
             5  ;MODE WORD IN CASE THEIR OLD ONE GOT MESSED UP BY NOISE.
             6  ;
             7  ;
             8  ;STARTED AS SCRSP.001    11-11-82
             9  ;
            10  ;SCRSP   11-11-82        DIGITAL FILTER FOR DOPLER RADAR
            11  ;R2000   3—15-83         DOUBLE RECIPRICAL OF FILTER #'S
            12  ;R2001   4—18-83         ADD STOP ROUTINE TO HELP AGAINST
            13  ;                        FALSE START UP'S
            14  ;R2002   4—20-83         ADD MOTION SENSOR INPUT
            15  ;R2003   4—21-83         MAKE CONTROL +/- 12%
            16  ;R2004   4—21-83         MAKE CONTROL +/- 6%
            17  ;R2005   5—13-83         USE LLD INSTEAD OF HLD FOR STARTUP
            18  ;R2006   5—13-83         <15HZ LOW GAIN >15HZ HIGH GAIN
```

```
LOC  OBJ      LINE     SOURCE STATEMENT

19 ;R2007  5--20-83    RESETUP MODES ON 8253
              20 ;                    USE P1-6 FOR 8253 CHIP SELECT
              21 ;R2008  6—1—83      MAKE STARTUP POSITIVE RANGE BIGGER
              22 ;                    MAKE GAIN=LOW < 75HZ > GAIN=HIGH
              23 ;R2009  6—23-83     REMOVE LEVEL DETECT CODE
              24 ;                    MAKE SUPERFAST FILTER 7/80LD+1/9NEW
              25 ;R2010  7-20-83     MOVE OUTPUT TO COUNTERS RIGHT AFTER
              26 ;                    512HZ WAIT ROUTINE.
              27 ;
              28 ;SAMPLE RATE    512HZ
              29 ;
              30 ;CORNER FREQUENCIES  (.644)  FOR OUTPUT SLOW
              31 ;                    (2.59)  FOR OUTPUT FAST
              32 ;                    (.332)  FOR INPUT SLOW
              33 ;                    (2.59)  FOR INPUT FAST
              34 ;SUPERFAST FILTER    (10.4)  FOR INPUT AND OUTPUT
              35 ;
              36 ;
              37 ;##############################################
              38 ;MEMORY MAP
              39 ;##############################
              40 ;00 R0  UNDEDICATED MEMORY POINTER USED ONLY IN MAIN
              41 ;01 R1  SAMPLE COUNTER USED TO INITIATE CONTROL LOOP (^32HZ)
              42 ;02 R2  UNDEDICATED SCRATCH REGISTER USED ONLY IN MAIN
              43 ;03 R3       "       "       "       "       "
              44 ;04 R4       "       "       "       "       "
              45 ;05 R5       "       "       "       "       "
              46 ;06 R6       "       "       "       "       "
              47 ;07 R7       "       "       "       "       "
              48 ;08 THRU 17 SYSTEM STACK 8DEEP
              49 ;18 R0' MEMORY POINTER USED IN INTERRUPT
              50 ;19 R1' TEMPORARY ACCUMULATOR DURRING INTERRUPT PROCESSING
              51 ;1A R2'
              52 ;1B R3'
              53 ;1C R4' PERIOD COUNT LSB TEMPORARY REG.
              54 ;1D R5' PERIOD COUNT MSB TEMPORARY REG.
              55 ;1E R6' PERIOD COUNT LSB HOLDING REG.
              56 ;1F R7' PERIOD COUNT MSB HOLDING REG.
              57 ;20     FAST REF. FILTER LSB    30 LSB OLD PERIOD
              58 ;21     FAST REF. FILTER MB     31 MSB OLD PERIOD
              59 ;22     FAST REF. FILTER MSB    32
              60 ;23     SLOW REF. FILTER LSB    33
              61 ;24     SLOW REF. FILTER MB     34 # OF POS SUMS CNTR
              62 ;25     SLOW REF. FILTER MSB    35 # OF TOTAL SUMS CNTR
              63 ;26     OUTPUT FILTER LSB       36 LSB OUTPUT FILTER FOR SCALING
              64 ;27     OUTPUT FILTER MB        37 MB OUTPUT FILTER FOR SCALING
              65 ;28     OUTPUT FILTER MSB       38 MSB OUTPUT FILTER FOR SCALING
              66 ;29     RECIP. PERIOD CNT. LSB  39
              67 ;2A     RECIP. PERIOD CNT. MB   3A
              68 ;2B     RECIP. PERIOD CNT. MSB  3B
              69 ;2C                             3C NEW PERIOD FLAG
              70 ;2D                             3D STOP FLAG (1=STOPPED)
              71 ;2E                             3E
              72 ;2F                             3F LAST STATE F0
```

| LOC OBJ | LINE | SOURCE STATEMENT |
|---|---|---|
| | 73 | |
| | 74 | |
| | 75 | ;############################ |
| | 76 | ;FLAGS |
| | 77 | ;############################ |
| | 78 | ;F0    OUTPUT FILTER SELECT (F0=1 INDICATES FAST FILTER SELECTED) |
| | 79 | ;F1    USED TO INITIATE OVERFLOW SEQUENCE IN INTERRUPT |
| | 80 | ;############################ |
| | 81 | ;I/O MAP |
| | 82 | ;############################ |
| | 83 | ;INT/  SAMPLE RATE CLOCK INPUT (NOT USED AS INTERRUPT) |
| | 84 | ;T1    RADAR SIGNAL INPUT TO INTERNAL COUNTER (TC) PRESET TO (0FFH) SO TO |
| | 85 | ;      GENERATE AN INTERRUPT EACH RISING EDGE |
| | 86 | ;T0    PERIOD COUNTER OVERFLOW FLAG (T0=1 INDICATES OVERFLOW) |
| | 87 | ;BUS   DATA BUS TO 8253 TIMER COUNTER CHIP |
| | 88 | ;P10   INPUT FAST, INPUT SLOW OR OUTPUT FILTER SELECT |
| | 89 | ;P11     "       "       "       "       "       " |
| | 90 | ;      PORT 1  BIT0    BIT1    FUNCTION |
| | 91 | ;              0       0       COMBINATION |
| | 92 | ;              1       0       REF. FAST |
| | 93 | ;              0       1       REF. SLOW |
| | 94 | ;P12   1 OF 4 OUTPUT SCALE FACTORS DECODE |
| | 95 | ;P13     "       "       "       "       " |
| | 96 | ;P14   WINDOW REJECT SELECT (1=+50% 0=+25%) |
| | 97 | ;P15   WINDOW REJECT SELECT (1=-50% 0=-25%) |
| | 98 | ;P16   CHIP SELECT FOR 8253 |
| | 99 | ;P17   256HZ TOGGLE FOR WATCH DOG |
| | 100 | ;############################################################### |
| | 101 | ;P20 AND P21 ADDRESS SELECT FOR 8253 TIMER COUNTER CHIP |
| | 102 | ;              P20     P21 |
| | 103 | ;              0       0       COUNTER 0 |
| | 104 | ;              0       1       COUNTER 1 |
| | 105 | ;              1       0       COUNTER 2 |
| | 106 | ;              1       1       CONTROL |
| | 107 | ;P22   RESET LEVEL DETECTOR |
| | 108 | ;P23   SIGNAL OUTPUT DISABLE (OUTPUT HIGH WHEN DISABLED) |
| | 109 | ;P24   LOW LEVEL DETECT INPUT (1=GOOD 0=BAD) |
| | 110 | ;P25   GAIN CONTROL OUTPUT |
| | 111 | ;P26   HIGH LEVEL DETECT INPUT (1=GOOD 0=BAD) |
| | 112 | ;P27   MOTION SENSOR INPUT (LOW=ENABLED AND HIGH=DISABLED) |
| | 113 | ;############################################################### |
| | 114 | |
| | 115 | ; |
| | 116 | ;   GO TO INITALIZE ROUTINE |
| | 117 | ; |
| 0000 | 118 | ORG     0 |
| 0000 0409 | 119 | JMP     INITAL |
| | 120 | ; |
| | 121 | ;   GO TO TIMER INTERRUPT SERVICE ROUTINE |
| | 122 | ; |
| 0007 | 123 | ORG     7 |
| 0007 841F | 124 | JMP     PERIOD |
| | 125 | ; |
| | 126 | ; THIS THE INITALIZE ROUTINE WHICH DISABLES SIGNAL OUTPUT, |

| LOC OBJ | LINE | SOURCE STATEMENT |
|---|---|---|
| | 127 ; | SET PORTS TO STARTING LEVEL, CLEAR ALL REGISTERS AND FLAGS, |
| | 128 ; | AND INITALIZES THE 8253 COUNTER CHIP. |
| | 129 ; | |
| | 130 ; | SET UP PORT 2 FOR OUTPUT (SET DEFAULT LEVELS) |
| | 131 ; | |
| 0009 D43B | 132 | INITAL: CALL CSON |
| 000B 23F7 | 133 | MOV A,#0F7H ;CONTROL REG.-ON 8253 ADDRESSED |
| 000D 3A | 134 | OUTL P2,A ;BIT 3 LOW-DISABLES 8253 OUTPUT |
| | 135 ; | |
| | 136 ; | SETUP COUNTER 0 FOR MODE 0 (OUTPUT HIGH ON TERMINAL CNT) |
| | 137 ; | THIS COUNTER USED FOR SAMPLE RATE INPUT CLOCK |
| | 138 ; | |
| 000E 2330 | 139 | MOV A,#30H |
| 0010 90 | 140 | MOVX @R0,A |
| | 141 ; | |
| | 142 ; | SETUP COUNTER 1 FOR MODE 3 (SQUARE WAVE GENERATOR) |
| | 143 ; | THIS COUNTER USED FOR OUTPUT SIGNAL |
| | 144 ; | |
| 0011 2376 | 145 | MOV A,#76H |
| 0013 90 | 146 | MOVX @R0,A |
| | 147 ; | |
| | 148 ; | SETUP COUNTER 3 FOR MODE 0 (OUTPUT HIGH ON TERMINAL COUNT) |
| | 149 ; | THIS COUNTER USED TO MEASURE PERIOD COUNT AND SIGNAL |
| | 150 ; | OVERFLOW CONDITION ON (TO INPUT). |
| | 151 ; | |
| 0014 23B0 | 152 | MOV A,#0B0H |
| 0016 90 | 153 | MOVX @R0,A |
| | 154 ; | |
| | 155 ; | SET UP COUNTER 0 FOR 512HZ OUTPUT HIGH ON TERMINAL COUNT |
| | 156 ; | |
| 0017 9AFC | 157 | ANL P2,#0FCH;ADDRESS COUNTER 0 |
| 0019 23EB | 158 | MOV A,#0EBH ;PRE LOAD DOWN COUNTER WITH 1259 (04EBH) |
| 001B 90 | 159 | MOVX @R0,A ;TO PROVIDE A SAMPLE RATE CLOCK OF 512HZ |
| 001C 2304 | 160 | MOV A,#04H |
| 001E 90 | 161 | MOVX @R0,A |
| | 162 ; | |
| | 163 ; | PRELOAD COUNTER 2 WITH OFFSET FOR INTERRUPT SERVICE DELAY TIME |
| | 164 ; | |
| 001F 8A02 | 165 | ORL P2,#02 ;ADDRESS COUNTER 2 |
| 0021 2301 | 166 | MOV A,#01H ;PRE LOAD DOWN COUNTER WITH 1 |
| 0023 90 | 167 | MOVX @R0,A ;SO IT WILL OVERFLOW ON POWER UP |
| 0024 27 | 168 | CLR A |
| 0025 90 | 169 | MOVX @R0,A |
| 0026 D48E | 170 | CALL CSOFF |
| | 171 ; | |
| | 172 ; | SETUP INTERNAL TIMER AS LATCHED EXTERNAL INTERRUPT |
| | 173 ; | THIS INTERRUPT IS USED SIGNAL THE END OF A PERIOD |
| | 174 ; | |
| 0028 23FF | 175 | MOV A,#0FFH |
| 002A 62 | 176 | MOV T,A ;SET UP INTERNAL UP COUNTER TO OVERFLOW ON THE |
| | 177 | ;NEXT FALLING EDGE OF THE RADAR SIGNAL WHICH INTURN |
| | 178 | ;GENERATES AN INTERRUPT INDICATING A START OF A |
| | 179 | ;NEW PERIOD |
| | 180 ; | |

| LOC OBJ | LINE | SOURCE STATEMENT | | |
|---|---|---|---|---|
| | 181 ; | NOW CLEAR ALL REGISTERS AND FLAGS | | |
| | 182 ; | | | |
| 002B 85 | 183 | CLR | F0 | ;CLEAR REGISTERS, MEMORY AND FLAGS |
| 002C A5 | 184 | CLR | F1 | |
| 002D B83F | 185 | MOV | R0,#3FH | |
| 002F B000 | 186 BKUP1: | MOV | @R0,#0 | |
| 0031 E82F | 187 | DJNZ | R0,BKUP1 | |
| | 188 ; | | | |
| | 189 ; | SET FILTER VALUES TO DEFAULT VALUES | | |
| | 190 ; | THESE VALUES ARE FOR THE SLOWEST OUTPUT FREQUENCIES | | |
| | 191 ; | | | |
| 0033 B81C | 192 | MOV | R0,#1CH | |
| 0035 23FF | 193 | MOV | A,#0FFH | |
| 0037 A0 | 194 | MOV | @R0,A | |
| 0038 18 | 195 | INC | R0 | |
| 0039 A0 | 196 | MOV | @R0,A | |
| 003A 18 | 197 | INC | R0 | |
| 003B A0 | 198 | MOV | @R0,A | |
| 003C 18 | 199 | INC | R0 | |
| 003D A0 | 200 | MOV | @R0,A | |
| 003E B822 | 201 | MOV | R0,#22H | |
| 0040 2301 | 202 | MOV | A,#01H | |
| 0042 A0 | 203 | MOV | @R0,A | |
| 0043 B825 | 204 | MOV | R0,#25H | |
| 0045 A0 | 205 | MOV | @R0,A | |
| 0046 B828 | 206 | MOV | R0,#28H | |
| 0048 A0 | 207 | MOV | @R0,A | |
| | 208 ; | | | |
| | 209 ; | SET STOPPED FLAG | | |
| | 210 ; | | | |
| 0049 B83D | 211 | MOV | R0,#3DH | |
| 004B B001 | 212 | MOV | @R0,#1 | |
| | 213 ; | | | |
| | 214 ; | SET UP PORT 1 FOR INPUT | | |
| | 215 ; | | | |
| 004D 23FF | 216 | MOV | A,#0FFH | |
| 004F 39 | 217 | OUTL | P1,A | |
| | 218 ; | | | |
| | 219 ; | R1 IS USED AS A DOWN COUNTER WHICH AT 0 COUNTS INITIATES | | |
| | 220 ; | THE CONTROL ALGORITHM. | | |
| | 221 ; | | | |
| 0050 B910 | 222 | MOV | R1,#10H | |
| | 223 ; | | | |
| | 224 ; | ENABLE TIMER INTERRUPTS BUT LEAVE EXT.INT. DISABLED | | |
| | 225 ; | | | |
| 0052 25 | 226 | EN | TCNTI | |
| 0053 45 | 227 | STRT | CNT | |
| | 228 ; | | | |
| | 229 ;************************************************************ | | | |
| | 230 ; | | | |
| | 231 ; | THIS IS THE MAIN LOOP STARTING POINT. | | |
| | 232 ; | | | |
| | 233 ;************************************************************ | | | |
| | 234 ; | | | |

```
LOC  OBJ        LINE       SOURCE STATEMENT

0054 B460       235 MAIN:  CALL    SCALE      ;SCALE AND RECIP. OUTPUT FILTER
0056 8656       236 MAN1:  JNI     MAN1       ;WAIT FOR EXT.INT. TO GO HIGH
                237 ;
                238 ;      NOW GET READY TO OUTPUT NEW PERIOD INFO
                239 ;
0058 35         240 OUT1:  DIS     TCNTI
0059 D5         241         SEL    RB1
                242 ;
                243 ;      PUT PERIOD INFO IN OLD REG. BEFORE REPLACING IT
                244 ;
005A B830       245         MOV    R0,#30H
005C FE         246         MOV    A,R6
005D A0         247         MOV    @R0,A
005E 18         248         INC    R0
005F FF         249         MOV    A,R7
0060 A0         250         MOV    @R0,A
                251 ;
                252 ;
0061 FC         253         MOV    A,R4
0062 AE         254         MOV    R6,A
0063 FD         255         MOV    A,R5
0064 AF         256         MOV    R7,A
0065 C5         257         SEL    RB0
                258 ;
                259 ;      NOW CHECK FOR RESET MODE FOR CNTR 1
                260 ;
0066 9AFC       261 CONT:  ANL    P2,#0FCH
0068 8A01       262         ORL    P2,#1
006A FE         263         MOV    A,R6
006B D48B       264         CALL   CSON
006D 90         265         MOVX   @R0,A
006E FF         266         MOV    A,R7
006F 90         267         MOVX   @R0,A
0070 0471       268         CALL   SETCO
0072 D48E       269         CALL   CSOFF
0074 25         270         EN     TCNTI
0075 00         271         NOP
0076 167A       272         JTF    CALP
0078 047C       273         JMP    FILTER
007A 941F       274 CALP:  CALL   PERIOD
                275 ;
                276 ;****************************************************************
                277 ;
                278 ;      THIS IS THE FAST REFERENCE FILTER
                279 ;
                280 ;****************************************************************
                281 ;
007C 09         282 FILTER: IN    A,P1       ;FLIP P1-7 FOR WATCH DOG CIRCUIT
007D D380       283         XRL    A,#80H
007F 437F       284         ORL    A,#7FH
0081 39         285         OUTL   P1,A
                286 ;
                287 ;      SET STACK POINTER BACK TO ZERO HERE INCASE OF NOISE
                288 ;
```

| LOC OBJ | LINE | SOURCE STATEMENT | | |
|---|---|---|---|---|
| 0082 C7 | 289 | MOV | A,PSW | |
| 0083 53F8 | 290 | ANL | A,#0F8H | |
| 0085 D7 | 291 | MOV | PSW,A | |
| | 292 ; | | | |
| | 293 ; CHECK FOR PERIOD OVERFLOW | | | |
| | 294 ; | | | |
| 0086 269F | 295 | JNTO | GETR | |
| | 296 ; | | | |
| | 297 ; IF PERIOD OVERFLOW THEN PERIOD = FFFF | | | |
| | 298 ; | | | |
| 0088 23FF | 299 | MOV | A,#0FFH | |
| 008A B81E | 300 | MOV | R0,#1EH | |
| 008C A0 | 301 | MOV | @R0,A | |
| 008D 18 | 302 | INC | R0 | |
| 008E A0 | 303 | MOV | @R0,A | |
| | 304 ; | | | |
| | 305 ; NOW GET RECIPRICAL OF THE PERIOD COUNTER DATA | | | |
| | 306 ; | | | |
| 008F 9473 | 307 GETR: | CALL | RECPD | ;GET RECIPRICAL OF PERIOD |
| | 308 ; | | | |
| | 309 ; | | | |
| 0091 B829 | 310 | MOV | R0,#29H | ;SAVE IN R29,2A,2B |
| 0093 FD | 311 | MOV | A,R5 | |
| 0094 A0 | 312 | MOV | @R0,A | |
| 0095 18 | 313 | INC | R0 | |
| 0096 FE | 314 | MOV | A,R6 | |
| 0097 A0 | 315 | MOV | @R0,A | |
| 0098 18 | 316 | INC | R0 | |
| 0099 FF | 317 | MOV | A,R7 | |
| 009A A0 | 318 | MOV | @R0,A | |
| | 319 ; | | | |
| | 320 ; NOW CHECK FOR SUPER FAST FILTER | | | |
| | 321 ; | | | |
| 009B 09 | 322 | IN | A,P1 | |
| 009C 5303 | 323 | ANL | A,#3 | |
| 009E 03FD | 324 | ADD | A,#-3 | |
| 00A0 96A4 | 325 | JNZ | FASTI | ;JMP IF NOT EQUAL TO 3 |
| 00A2 E400 | 326 | JMP | SUPER | ;JMP TO SUPER FAST FILTER |
| | 327 ; | | | |
| | 328 ; NOW FAST FILTER | | | |
| | 329 ; | | | |
| 00A4 B822 | 330 FASTI: | MOV | R0,#22H | ;GENERATE (31*PREV FST FLTR OUT/32)+PERIOD CNT/32 |
| 00A6 F0 | 331 | MOV | A,@R0 | |
| 00A7 AE | 332 | MOV | R6,A | |
| 00A8 C8 | 333 | DEC | R0 | |
| 00A9 F0 | 334 | MOV | A,@R0 | |
| 00AA AD | 335 | MOV | R5,A | |
| 00AB C8 | 336 | DEC | R0 | |
| 00AC F0 | 337 | MOV | A,@R0 | |
| | 338 ; | | | |
| | 339 ; DONE GETTING FAST FILTER INFO-NOW SHIFT RIGHT | | | |
| | 340 ; 5 TIMES TO GET (FST FLTR/32) | | | |
| | 341 ; | | | |
| 00AD B805 | 342 | MOV | R0,#5 | |

| LOC OBJ | LINE | SOURCE STATEMENT | | |
|---|---|---|---|---|
| 00AF 30 | 343 | XCHD | A,@R0 | |
| 00B0 47 | 344 | SWAP | A | |
| 00B1 AC | 345 | MOV | R4,A | ;LSB/16 |
| 00B2 FD | 346 | MOV | A,R5 | |
| 00B3 18 | 347 | INC | R0 | |
| 00B4 30 | 348 | XCHD | A,@R0 | |
| 00B5 47 | 349 | SWAP | A | |
| 00B6 AD | 350 | MOV | R5,A | ;MB/16 |
| 00B7 27 | 351 | CLR | A | |
| 00B8 2E | 352 | XCH | A,R6 | |
| 00B9 47 | 353 | SWAP | A | |
| 00BA 30 | 354 | XCHD | A,@R0 | |
| 00BB 97 | 355 | CLR | C | |
| | 356 ; | | | |
| | 357 ; | NOW ROTATE 1 TIME RIGHT | | |
| | 358 ; | | | |
| 00BC FE | 359 | MOV | A,R6 | |
| 00BD 67 | 360 | RRC | A | |
| 00BE 37 | 361 | CPL | A | |
| 00BF AE | 362 | MOV | R6,A | |
| 00C0 FD | 363 | MOV | A,R5 | |
| 00C1 67 | 364 | RRC | A | |
| 00C2 37 | 365 | CPL | A | |
| 00C3 AD | 366 | MOV | R5,A | |
| 00C4 FC | 367 | MOV | A,R4 | |
| 00C5 67 | 368 | RRC | A | |
| 00C6 37 | 369 | CPL | A | |
| | 370 ; | | | |
| | 371 ; | NOW ADD FST FLTR/32 COMPLEMENTED TO FST FLTR | | |
| | 372 ; | | | |
| 00C7 B820 | 373 SKIP1: | MOV | R0,#20H | ;ADD 3 MOST SGNIF ROTATED BYTES TO PREV FST FLTR OUT |
| 00C9 60 | 374 | ADD | A,@R0 | ;EFFECTIVELY GENERATING 31*PREV FLT OUT/32 |
| 00CA 2D | 375 | XCH | A,R5 | |
| 00CB 18 | 376 | INC | R0 | |
| 00CC 70 | 377 | ADDC | A,@R0 | |
| 00CD 2E | 378 | XCH | A,R6 | |
| 00CE 18 | 379 | INC | R0 | |
| 00CF 70 | 380 | ADDC | A,@R0 | |
| 00D0 AF | 381 | MOV | R7,A | |
| | 382 ; | | | |
| | 383 ; | NOW GET 1/32 OF NEW AND ADD TO 31/32 OLD | | |
| | 384 ; | | | |
| 00D1 B82B | 385 | MOV | R0,#2BH | ;PERIOD/32 SHIFT RIGHT 5 TIMES |
| 00D3 F0 | 386 | MOV | A,@R0 | |
| 00D4 AC | 387 | MOV | R4,A | |
| 00D5 C8 | 388 | DEC | R0 | |
| 00D6 F0 | 389 | MOV | A,@R0 | |
| 00D7 AB | 390 | MOV | R3,A | |
| 00D8 C8 | 391 | DEC | R0 | |
| 00D9 F0 | 392 | MOV | A,@R0 | |
| 00DA B803 | 393 | MOV | R0,#3 | |
| | 394 ; | | | |
| | 395 ; | NOW SHIFT RIGHT 4 TIMES | | |
| | 396 ; | | | |
| 00DC 30 | 397 | XCHD | A,@R0 | |

| LOC OBJ | LINE | SOURCE STATEMENT | | |
|---|---|---|---|---|
| 00DD 47 | 398 | SWAP | A | |
| 00DE AA | 399 | MOV | R2,A | ;LSB/16 |
| 00DF FB | 400 | MOV | A,R3 | |
| 00E0 18 | 401 | INC | R0 | |
| 00E1 30 | 402 | XCHD | A,@R0 | |
| 00E2 47 | 403 | SWAP | A | |
| 00E3 AB | 404 | MOV | R3,A | ;MB/16 |
| 00E4 27 | 405 | CLR | A | |
| 00E5 2C | 406 | XCH | A,R4 | |
| 00E6 47 | 407 | SWAP | A | |
| 00E7 30 | 408 | XCHD | A,@R0 | |
| | 409 ; | | | |
| | 410 ; NOW ROTATE 1 TIME RIGHT | | | |
| | 411 ; | | | |
| 00E8 97 | 412 | CLR | C | |
| 00E9 FC | 413 | MOV | A,R4 | |
| 00EA 67 | 414 | RRC | A | |
| 00EB AC | 415 | MOV | R4,A | |
| 00EC FB | 416 | MOV | A,R3 | |
| 00ED 67 | 417 | RRC | A | |
| 00EE AB | 418 | MOV | R3,A | |
| 00EF FA | 419 | MOV | A,R2 | |
| 00F0 67 | 420 | RRC | A | |
| 00F1 B820 | 421 SKIP2: | MOV | R0,#20H ;ADD 3 ROTATED BYTES TO PREVIOUS 3 BYTE SUM | |
| 00F3 6D | 422 | ADD | A,R5 | |
| 00F4 A0 | 423 | MOV | @R0,A | |
| 00F5 2400 | 424 | JMP | PAGE1 | |
| | 425 ; | | | |
| | 426 ; | | | |
| 0100 | 427 | ORG | 100H | |
| | 428 ; | | | |
| | 429 ; | | | |
| 0100 18 | 430 PAGE1: | INC | R0 | |
| 0101 FB | 431 | MOV | A,R3 | |
| 0102 7E | 432 | ADDC | A,R6 | |
| 0103 A0 | 433 | MOV | @R0,A | |
| 0104 18 | 434 | INC | R0 | |
| 0105 FC | 435 | MOV | A,R4 | |
| 0106 7F | 436 | ADDC | A,R7 | |
| 0107 A0 | 437 | MOV | @R0,A | |
| | 438 ; | | | |
| | 439 ; CHECK FOR OVER FLOW. IF CARRY SET MAKE FILTER FFFFFF | | | |
| | 440 ; | | | |
| 0108 E60C | 441 | JNC | SLOFLT | |
| 010A B458 | 442 | CALL | MAKFF | |
| | 443 ; | | | |
| | 444 ; NOW DO SLOW FILTER FOR CONTROL | | | |
| | 445 ; | | | |
| 010C B825 | 446 SLOFLT: | MOV | R0,#25H ;GENERATE (255*PREV SLO FLTR OUT/256)+PERIOD CNT/256 | |
| 010E F0 | 447 | MOV | A,@R0 | |
| 010F 37 | 448 | CPL | A | |
| 0110 AD | 449 | MOV | R5,A | |
| 0111 C8 | 450 | DEC | R0 | |
| 0112 F0 | 451 | MOV | A,@R0 | |
| 0113 C8 | 452 | DEC | R0 | |

| LOC OBJ | LINE | SOURCE STATEMENT | | |
|---|---|---|---|---|
| 0114 37 | 453 | CPL | A | |
| 0115 60 | 454 | ADD | A,@R0 | ;ADD 2 MOST SGNIF ROTATED BYTES TO PREV SLO FLT OUT |
| 0116 2D | 455 | XCH | A,R5 | ;EFFECTIVELY GENERATING 255*PREV FLT OUT/256 |
| 0117 18 | 456 | INC | R0 | |
| 0118 70 | 457 | ADDC | A,@R0 | |
| 0119 AE | 458 | MOV | R6,A | |
| 011A 18 | 459 | INC | R0 | |
| 011B F0 | 460 | MOV | A,@R0 | |
| 011C 13FF | 461 | ADDC | A,#0FFH | |
| 011E AF | 462 | MOV | R7,A | |
| | 463 ; | | | |
| | 464 ; | NOW GET NEW/256 | | |
| | 465 ; | | | |
| 011F B82B | 466 | MOV | R0,#2BH | ;GET FREQUENCY COUNT |
| 0121 F0 | 467 | MOV | A,@R0 | |
| 0122 AA | 468 | MOV | R2,A | |
| 0123 C8 | 469 | DEC | R0 | |
| 0124 F0 | 470 | MOV | A,@R0 | |
| 0125 B823 | 471 | MOV | R0,#23H | ;ADD PERIOD TO PREVIOUS 3 BYTE SUM |
| 0127 6D | 472 | ADD | A,R5 | |
| 0128 A0 | 473 | MOV | @R0,A | |
| 0129 FA | 474 | MOV | A,R2 | |
| 012A 7E | 475 | ADDC | A,R6 | |
| 012B 18 | 476 | INC | R0 | |
| 012C A0 | 477 | MOV | @R0,A | |
| 012D FF | 478 | MOV | A,R7 | |
| 012E 1300 | 479 | ADDC | A,#0 | |
| 0130 18 | 480 | INC | R0 | |
| 0131 A0 | 481 | MOV | @R0,A | |
| | 482 ; | | | |
| | 483 ; | NOW CHECK FOR OVERFLOW. IF CARRY SET MAKE FILTER FFFFFF | | |
| | 484 ; | | | |
| 0132 E636 | 485 | JNC | CNTRL | |
| 0134 B458 | 486 | CALL | MAKFF | |
| | 487 ;*********************************************************** | | | |
| | 488 ; | | | |
| | 489 ; | THIS IS THE CONTROL PORTION OF THE PROGRAM | | |
| | 490 ; | | | |
| | 491 ; | CONTROL SWITCHES TO FAST WHEN1 FAST FILTER | | |
| | 492 ; | IS MORE THAN +/- 6% AWAY FROM SLOW FILTER | | |
| | 493 ; | | | |
| | 494 ;*********************************************************** | | | |
| | 495 ; | | | |
| 0136 E9CA | 496 CNTRL: | DJNZ | R1,WINDOW | ;SKIP CONTROL ALGORITHM 15 OUT OF 16 SAMPLE TIMES |
| 0138 B910 | 497 | MOV | R1,#10H | ;RESET SAMPLE COUNTER |
| | 498 ; | | | |
| | 499 ; | NOW DO CONTROL ALGORITHM | | |
| | 500 ; | | | |
| 013A B825 | 501 | MOV | R0,#25H | ;IF (.9375 SLO > FST > 1.0625 SLO) THEN FAST |
| 013C 97 | 502 | CLR | C | ;SHIFT RIGHT SLO FLTR 3 BYTES 1 BIT RIGHT |
| 013D F0 | 503 | MOV | A,@R0 | ;TO GET SLO/2 |
| 013E 67 | 504 | RRC | A | |
| 013F AC | 505 | MOV | R4,A | |
| 0140 C8 | 506 | DEC | R0 | |

| | | | | |
|---|---|---|---|---|
| 0141 F0 | 507 | MOV | A,@R0 | |
| 0142 67 | 508 | RRC | A | |
| 0143 AB | 509 | MOV | R3,A | |
| 0144 C8 | 510 | DEC | R0 | |
| 0145 F0 | 511 | MOV | A,@R0 | |
| 0146 67 | 512 | RRC | A | |
| 0147 AA | 513 | MOV | R2,A | |
| 0148 97 | 514 | CLR | C | ;SHIFT RIGHT AGAIN TO GET SLO/4 |
| 0149 FC | 515 | MOV | A,R4 | |
| 014A 67 | 516 | RRC | A | |
| 014B AC | 517 | MOV | R4,A | |
| 014C FB | 518 | MOV | A,R3 | |
| 014D 67 | 519 | RRC | A | |
| 014E AB | 520 | MOV | R3,A | |
| 014F FA | 521 | MOV | A,R2 | |
| 0150 67 | 522 | RRC | A | |
| 0151 AA | 523 | MOV | R2,A | |
| 0152 97 | 524 | CLR | C | ;SHIFT RIGHT AGAIN TO GET SLO/8 |
| 0153 FC | 525 | MOV | A,R4 | |
| 0154 67 | 526 | RRC | A | |
| 0155 AC | 527 | MOV | R4,A | |
| 0156 FB | 528 | MOV | A,R3 | |
| 0157 67 | 529 | RRC | A | |
| 0158 AB | 530 | MOV | R3,A | |
| 0159 FA | 531 | MOV | A,R2 | |
| 015A 67 | 532 | RRC | A | |
| 015B AA | 533 | MOV | R2,A | |
| 015C 97 | 534 | CLR | C | ;SHIFT RIGHT AGAIN TO GET SLO/16 |
| 015D FC | 535 | MOV | A,R4 | |
| 015E 67 | 536 | RRC | A | |
| 015F AC | 537 | MOV | R4,A | |
| 0160 FB | 538 | MOV | A,R3 | |
| 0161 67 | 539 | RRC | A | |
| 0162 AB | 540 | MOV | R3,A | |
| 0163 FA | 541 | MOV | A,R2 | |
| 0164 67 | 542 | RRC | A | |
| 0165 AA | 543 | MOV | R2,A | |
| 0166 B823 | 544 | MOV | R0,#23H | ;ADD RESULT TO SLO FLTR TO GET 1.0625 SLO |
| 0168 F0 | 545 | MOV | A,@R0 | |
| 0169 6A | 546 | ADD | A,R2 | |
| 016A AD | 547 | MOV | R5,A | |
| 016B 18 | 548 | INC | R0 | |
| 016C F0 | 549 | MOV | A,@R0 | |
| 016D 7B | 550 | ADDC | A,R3 | |
| 016E AE | 551 | MOV | R6,A | |
| 016F 18 | 552 | INC | R0 | |
| 0170 F0 | 553 | MOV | A,@R0 | |
| 0171 7C | 554 | ADDC | A,R4 | |
| 0172 AF | 555 | MOV | R7,A | |
| 0173 E67A | 556 | JNC | BACK | ;JMP IF NO OVERFLOW |
| 0175 23FF | 557 | MOV | A,#0FFH | |
| 0177 AD | 558 | MOV | R5,A | |
| 0178 AE | 559 | MOV | R6,A | |
| 0179 AF | 560 | MOV | R7,A | |
| 017A B820 | 561 BACK: | MOV | R0,#20H | ;SUBTRACT FST FLTR TO GET 1.0625 SLO - FST |
| 017C F0 | 562 | MOV | A,@R0 | |

```
017D 37        563       CPL    A
017E 6D        564       ADD    A,R5
017F 18        565       INC    R0
0180 F0        566       MOV    A,@R0
0181 37        567       CPL    A
0182 7E        568       ADDC   A,R6
0183 18        569       INC    R0
0184 F0        570       MOV    A,@R0
0185 37        571       CPL    A
0186 7F        572       ADDC   A,R7
0187 C5        573       CLR    F0
0188 95        574       CPL    F0      ;SET F0=1 TO SELECT FAST OUTPUT FILTER
0189 E6B1      575       JNC    MARK    ;IF FAST OUTPUT IS REQUIRED GO TO OUTPUT FILTER
               576
018B FA        577       MOV    A,R2    ;COMPLEMENT SLO/16
018C 37        578       CPL    A
018D AA        579       MOV    R2,A
018E FB        580       MOV    A,R3
018F 37        581       CPL    A
0190 AB        582       MOV    R3,A
0191 FC        583       MOV    A,R4
0192 37        584       CPL    A
0193 AC        585       MOV    R4,A
0194 B823      586       MOV    R0,#23H ;ADD RESULTS TO SLO FLTR TO GET .9375 SLO
0196 F0        587       MOV    A,@R0
0197 6A        588       ADD    A,R2
0198 37        589       CPL    A       ;THEN COMPLEMENT
0199 AA        590       MOV    R2,A
019A 18        591       INC    R0
019B F0        592       MOV    A,@R0
019C 7B        593       ADDC   A,R3
019D 37        594       CPL    A
019E AB        595       MOV    R3,A
019F 18        596       INC    R0
01A0 F0        597       MOV    A,@R0
01A1 7C        598       ADDC   A,R4
01A2 37        599       CPL    A
01A3 AC        600       MOV    R4,A
01A4 B820      601       MOV    R0,#20H ;SUBTRACT FROM FST FLTR TO GET FST - .9375 SLO
01A6 F0        602       MOV    A,@R0
01A7 6A        603       ADD    A,R2
01A8 18        604       INC    R0
01A9 F0        605       MOV    A,@R0
01AA 7B        606       ADDC   A,R3
01AB 18        607       INC    R0
01AC F0        608       MOV    A,@R0
01AD 7C        609       ADDC   A,R4
01AE E6B1      610       JNC    MARK    ;IF FAST OUTPUT IS REQUIRED GO TO OUTPUT FILTER
01B0 C5        611       CLR    F0      ;ELSE SET F0=0 TO SELECT SLOW OUTPUT FILTER
               612 ;
               613 ;     NOW CHECK FOR EXTERNAL FILTER SELECT
               614 ;
01B1 09        615 MARK: IN     A,P1
01B2 5303      616       ANL    A,#3
01B4 C6BA      617       JZ     MARK2
01B6 C5        618       CLR    F0
01B7 32BA      619       JB1    MARK2
```

```
01B9 95          620           CPL     F0
01BA B83F        621 MARK2:    MOV     R0,#3FH
01BC 2301        622           MOV     A,#1
01BE B6C1        623           JF0     CKSAME
01C0 27          624           CLR     A
01C1 D0          625 CKSAME:   XRL     A,@R0
01C2 C6C4        626           JZ      SETF0   ;JMP IF SAME
                 627 ;
                 628 ;  TOGGLE PORT FOR FAST SLOW SWITCH
                 629 ;
01C4 2301        630 SETF0:    MOV     A,#1
01C6 B6C9        631           JF0     SET1
01C8 27          632           CLR     A
01C9 A0          633 SET1:     MOV     @R0,A
                 634 ;
                 635 ;  NOW DO WINDOW ROUTINE(+ OR - 25%)
                 636 ;
01CA 2321        637 WINDOW:   MOV     A,#21H  ;REF. FAST FILTER
01CC B6D0        638           JF0     GETPD
01CE 2324        639           MOV     A,#24H  ;REF. SLOW FILTER
01D0 A8          640 GETPD:    MOV     R0,A
                 641 ;
                 642 ;  NOW PUT APPROPRIATE FILTER IN R3-4 AND R5-6
                 643 ;
01D1 F0          644           MOV     A,@R0
01D2 AB          645           MOV     R3,A
01D3 AE          646           MOV     R6,A
01D4 18          647           INC     R0
01D5 F0          648           MOV     A,@R0
01D6 AC          649           MOV     R4,A
01D7 AF          650           MOV     R7,A
                 651 ;
                 652 ;  NOW DO 25% WINDOW
                 653 ;
01D8 97          654           CLR     C
01D9 FC          655           MOV     A,R4
01DA 67          656           RRC     A
01DB AC          657           MOV     R4,A
01DC FB          658           MOV     A,R3
01DD 67          659           RRC     A
01DE AB          660           MOV     R3,A
01DF 97          661 PLS50:    CLR     C
01E0 FC          662           MOV     A,R4
01E1 67          663           RRC     A
01E2 AC          664           MOV     R4,A
01E3 FB          665           MOV     A,R3
01E4 67          666           RRC     A
                 667 ;
                 668 ;  NOW ADD 25% TO SELECTED FILTER AND COMPLEMENT RESULT
                 669 ;
01E5 6E          670           ADD     A,R6
01E6 37          671           CPL     A
01E7 AB          672           MOV     R3,A
01E8 FC          673           MOV     A,R4
01E9 7F          674           ADDC    A,R7
01EA 37          675           CPL     A
```

```
01EB AC        676          MOV    R4,A
01EC F6F9      677          JC     CKLOW    ;JMP IF OVERFLOW
               678 ;
               679 ; NOW GET (RECIP. - (SELECTED FILTER + 25%))
               680 ;
01EE B82A      681          MOV    R0,#2AH
01F0 FB        682          MOV    A,R3
01F1 60        683          ADD    A,@R0
01F2 18        684          INC    R0
01F3 FC        685          MOV    A,R4
01F4 70        686          ADDC   A,@R0
01F5 E6F9      687          JNC    CKLOW    ;JMP IF GOOD
01F7 4423      688          JMP    REJECT   ;JMP IF BAD
               689 ;
               690 ; NOW CHECK FOR RECIP. LOWER THAN WINDOW
               691 ;
               692 ; NOW PUT SELECTED FILTER IN R3-4
               693 ;
01F9 4400      694 CKLOW:   JMP    PAGE2
               695 ;
               696 ;
0200           697          ORG    200H
               698 ;
               699 ;
0200 FE        700 PAGE2:   MOV    A,R6
0201 AB        701          MOV    R3,A
0202 FF        702          MOV    A,R7
0203 AC        703          MOV    R4,A
               704 ;
               705 ; NOW DO -25%
               706 ;
0204 97        707          CLR    C
0205 FC        708          MOV    A,R4
0206 67        709          RRC    A
0207 AC        710          MOV    R4,A
0208 FB        711          MOV    A,R3
0209 67        712          RRC    A
020A AB        713          MOV    R3,A
020B 97        714 MIN50:   CLR    C
020C FC        715          MOV    A,R4
020D 67        716          RRC    A
020E 37        717          CPL    A
020F AC        718          MOV    R4,A
0210 FB        719          MOV    A,R3
0211 67        720          RRC    A
0212 37        721          CPL    A
               722 ;
               723 ; NOW ADD -25% TO SELECTED FILTER AND COMP RESULT
               724 ;
0213 6E        725          ADD    A,R6
0214 37        726          CPL    A
0215 AB        727          MOV    R3,A
0216 FC        728          MOV    A,R4
0217 7F        729          ADDC   A,R7
0218 37        730          CPL    A
0219 AC        731          MOV    R4,A
               732 ;
```

```
                733 ;    NOW GET (RECIP. - (.75 (SELECTED FILTER))
                734 ;
021A B82A       735          MOV     R0,#2AH
021C FB         736          MOV     A,R3
021D 60         737          ADD     A,@R0
021E 18         738          INC     R0
021F FC         739          MOV     A,R4
0220 70         740          ADDC    A,@R0
0221 F625       741          JC      FAST         ;JMP IF PERIOD GOOD
0223 44CF       742 REJECT: JMP     OUTPUT
0225 09         743 FAST:   IN      A,P1
0226 5303       744          ANL     A,#3
0228 03FD       745          ADD     A,#-3
022A 962E       746          JNZ     CKF0         ;JMP IF NOT EQUAL 3
022C E448       747          JMP     SUPER1
                748 ;
                749 ;    NOW CHECK FOR FAST OR SLOW OUTPUT FILTERS
                750 ;
022E B632       751 CKF0:   JF0     FAST2
0230 4491       752          JMP     SLOW
0232 B828       753 FAST2:  MOV     R0,#28H ;GENERATE (31*PREV OUT FLTR /32)+PERIOD CNT/32
0234 F0         754          MOV     A,@R0    ;THIS IS ACCOMPLISHED BY THE FOLLOWING
                755 ;
                756 ;    FIRST PUT OUTPUT FILTER IN R6,R5,ACCUM
                757 ;
0235 AE         758          MOV     R6,A
0236 C8         759          DEC     R0
0237 F0         760          MOV     A,@R0
0238 AD         761          MOV     R5,A
0239 C8         762          DEC     R0
023A F0         763          MOV     A,@R0
                764 ;
                765 ;    NOW SHIFT RIGHT 5 TIMES
                766 ;
023B B805       767          MOV     R0,#5
023D 30         768          XCHD    A,@R0
023E 47         769          SWAP    A
023F AC         770          MOV     R4,A         ;LSB/16
0240 FD         771          MOV     A,R5
0241 18         772          INC     R0
0242 30         773          XCHD    A,@R0
0243 47         774          SWAP    A
0244 AD         775          MOV     R5,A         ;MB/16
0245 27         776          CLR     A
0246 2E         777          XCH     A,R6
0247 47         778          SWAP    A
0248 30         779          XCHD    A,@R0        ;MSB/16
                780 ;
                781 ;    NOW ROTATE 1 TIME RIGHT AND COMPLEMENT
                782 ;
0249 97         783          CLR     C
024A FE         784          MOV     A,R6
024B 67         785          RRC     A
024C 37         786          CPL     A
024D AE         787          MOV     R6,A
024E FD         788          MOV     A,R5
024F 67         789          RRC     A
```

```
0250 37       790         CPL     A
0251 AD       791         MOV     R5,A
0252 FC       792         MOV     A,R4
0253 67       793         RRC     A
0254 37       794         CPL     A
0255 B826     795 SKIP3:  MOV     R0,#26H ;ADD 3 MOST SGNIF ROTATED BYTES TO PREV FST FLTR OUT
0257 60       796         ADD     A,@R0   ;EFFECTIVELY GENERATING 31*PREV OUT FLT/32
0258 2D       797         XCH     A,R5
0259 18       798         INC     R0
025A 70       799         ADDC    A,@R0
025B 2E       800         XCH     A,R6
025C 18       801         INC     R0
025D 70       802         ADDC    A,@R0
025E AF       803         MOV     R7,A
              804 ;
              805 ;       NOW GET 1/32 OF NEW AND ADD TO 31/32 OLD
              806 ;
025F B82B     807         MOV     R0,#2BH ;PERIOD/32 SHIFT RIGHT 5 TIMES
0261 F0       808         MOV     A,@R0
0262 AC       809         MOV     R4,A
0263 C8       810         DEC     R0
0264 F0       811         MOV     A,@R0
0265 AB       812         MOV     R3,A
0266 C8       813         DEC     R0
0267 F0       814         MOV     A,@R0
0268 B803     815         MOV     R0,#3
              816 ;
              817 ;       NOW SWAP RIGHT 4 TIMES
              818 ;
026A 30       819         XCHD    A,@R0
026B 47       820         SWAP    A
026C AA       821         MOV     R2,A      ;LSB/16
026D FB       822         MOV     A,R3
026E 18       823         INC     R0
026F 30       824         XCHD    A,@R0
0270 47       825         SWAP    A
0271 AB       826         MOV     R3,A      ;MB/16
0272 27       827         CLR     A
0273 2C       828         XCH     A,R4
0274 47       829         SWAP    A
0275 30       830         XCHD    A,@R0
              831 ;
              832 ;       NOW ROTATE 1 TIME RIGHT
              833 ;
0276 97       834         CLR     C
0277 FC       835         MOV     A,R4
0278 67       836         RRC     A
0279 AC       837         MOV     R4,A
027A FB       838         MOV     A,R3
027B 67       839         RRC     A
027C AB       840         MOV     R3,A
027D FA       841         MOV     A,R2
027E 67       842         RRC     A
027F B826     843 SKIP4:  MOV     R0,#26H ;ADD 2 MOST SGNIF ROTATED BYTES TO PREVIOUS 3 BYTE SUM
0281 6D       844         ADD     A,R5
0282 A0       845         MOV     @R0,A
```

```
0283 18       846         INC     R0
0284 FB       847         MOV     A,R3
0285 7E       848         ADDC    A,R6
0286 A0       849         MOV     @R0,A
0287 18       850         INC     R0
0288 FC       851         MOV     A,R4
0289 7F       852         ADDC    A,R7
028A A0       853         MOV     @R0,A
              854 ;
              855 ; CHECK FOR OVERFLOW. IF CARRY SET THEN MAKE FILTER FFFFFF
              856 ;
028B E6CF     857         JNC     OUTPUT
028D 8458     858         CALL    MAKFF
028F 44CF     859         JMP     OUTPUT
              860 ;
              861 ; THIS IS SLOW OUTPUT FILTER
              862 ;
              863 ; THIS ROUTINE IS A .664HZ CORNER FILTER FOR
              864 ; THE OUTPUT SLOW FILTER
              865 ;
              866 ; FIRST GET 127*OUTPUT/128
              867 ;
0291 B826     868 SLOW:   MOV     R0,#26H
0293 F7       869         RLC     A
0294 18       870         INC     R0
0295 F0       871         MOV     A,@R0
0296 F7       872         RLC     A
0297 37       873         CPL     A
0298 AD       874         MOV     R5,A
0299 18       875         INC     R0
029A F0       876         MOV     A,@R0
029B F7       877         RLC     A
029C 37       878         CPL     A
029D AE       879         MOV     R6,A
029E 27       880         CLR     A
029F F7       881         RLC     A
02A0 37       882         CPL     A
02A1 AF       883         MOV     R7,A
              884 ;
              885 ; NOW SUBTRACT 1/127OUTPUT FROM OUTPUT
              886 ;
02A2 B826     887         MOV     R0,#26H ;LSB OUTPUT FILTER
02A4 F0       888         MOV     A,@R0
02A5 6D       889         ADD     A,R5
02A6 AD       890         MOV     R5,A
02A7 18       891         INC     R0
02A8 FE       892         MOV     A,R6
02A9 70       893         ADDC    A,@R0
02AA AE       894         MOV     R6,A
02AB 18       895         INC     R0
02AC F0       896         MOV     A,@R0
02AD 7F       897         ADDC    A,R7
02AE AF       898         MOV     R7,A
              899 ;
              900 ; NOW GET 1/128 OF NEW DATA AND ADD TO 127/128OLD
              901 ;
```

```
02AF B829      902        MOV     R0,#29H
02B1 F0        903        MOV     A,@R0
02B2 F7        904        RLC     A
02B3 18        905        INC     R0
02B4 F0        906        MOV     A,@R0
02B5 F7        907        RLC     A
02B6 AA        908        MOV     R2,A
02B7 18        909        INC     R0
02B8 F0        910        MOV     A,@R0
02B9 F7        911        RLC     A
02BA AB        912        MOV     R3,A
02BB 27        913        CLR     A
02BC F7        914        RLC     A
02BD AC        915        MOV     R4,A
               916 ;
               917 ;      NOW ADD DATA
               918 ;
02BE B826      919        MOV     R0,#26H
02C0 FA        920        MOV     A,R2
02C1 6D        921        ADD     A,R5
02C2 A0        922        MOV     @R0,A
02C3 18        923        INC     R0
02C4 FB        924        MOV     A,R3
02C5 7E        925        ADDC    A,R6
02C6 A0        926        MOV     @R0,A
02C7 18        927        INC     R0
02C8 FC        928        MOV     A,R4
02C9 7F        929        ADDC    A,R7
02CA A0        930        MOV     @R0,A
               931 ;
               932 ;      CHECK FOR OVERFLOW. IF CARRY SET THEN FILTER =FFFFFF
               933 ;
02CB E6CF      934        JNC     OUTPUT
02CD B458      935        CALL    MAKFF
               936 ;
               937 ;      NOW DO CHECK FOR OUTPUT FILTER BEING SLOW ENOUGH
               938 ;      TO DISABLE OUTPUT SO SIGNAL STOPS
               939 ;
               940 ;      FIRST CHECK FOR NO MOTION SIGNAL ON P2-7 (1=DISABLE)
               941 ;
02CF 0A        942 OUTPUT: IN     A,P2
02D0 F2E1      943        JB7     DSABLE  ;JMP IF NO MOTION
02D2 B828      944        MOV     R0,#28H ;GET MSB OUTPUT FILTER
02D4 F0        945        MOV     A,@R0
02D5 C6E1      946        JZ      DSABLE  ;JMP IF MSB =0
02D7 53FE      947        ANL     A,#0FEH
02D9 96E5      948        JNZ     CKAG
02DB C8        949        DEC     R0
02DC F0        950        MOV     A,@R0
02DD 0387      951        ADD     A,#-079H
02DF F6E5      952        JC      CKAG    ;JMP IF GREATER
               953 ;
               954 ;      OUTPUT FILTER <15HZ SO DISABLE OUTPUT AND SET LOW GAIN
               955 ;
02E1 9AD7      956 DSABLE: ANL    P2,#0D7H
02E3 8400      957        JMP     PAGE4
02E5 8410      958 CKAG:  JMP     CKAG1
```

```
                959 ;
                960 ;
0400            961        ORG    400H
                962 ;
                963 ;
0400 B83D       964 PAGE4: MOV    R0,#3DH ;SET STOPPED FLAG
0402 B001       965        MOV    @R0,#1
                966 ;
                967 ; ALSO RESET NEW PERIOD FLAG AND SET
                968 ; OLD FAST FILTER TO 100H 256D
                969 ;
0404 18         970        INC    R0
0405 B000       971        MOV    @R0,#0   ;RESET FLAG
0407 B830       972        MOV    R0,#30H
0409 B000       973        MOV    @R0,#0
040B 18         974        INC    R0
040C B001       975        MOV    @R0,#1
040E 0454       976        JMP    MAIN
                977 ;
                978 ; IS OUTPUT FILTER > 8FH IF SO ENABLE OUTPUT
                979 ;
0410 B83D       980 CKAG1: MOV    R0,#3DH ;CHECK FOR STOPPED FLAG
0412 F0         981        MOV    A,@R0
0413 C619       982        JZ     MAIN1   ;JMP IF NOT STOPPED
                983 ;
                984 ; NOW DO STOPPED ROUTINE
                985 ;
0415 D400       986        CALL   STPOUT
0417 0454       987        JMP    MAIN
                988 ;
0419 8A08       989 MAIN1: ORL    P2,#09H ;ENABLE OUTPUT GAIN HIGH
                990 ;
                991 ; CK75 IS A ROUTINE THAT SETS GAIN HIGH IF OUTPUT
                992 ; FILTER VALUE IS >75HZ ELSE GAIN IS SET LOW
                993 ;
041B D491       994        CALL   CK75
041D 0454       995        JMP    MAIN
                996 ;
                997 ;
                998 ;**************************************************************
                999 ;
                1000 ; NOW DO SUBROUTINES
                1001 ;
                1002 ;**************************************************************
                1003 ;
041F D5         1004 PERIOD: SEL  RB1      ;SAVE REGISTERS
0420 A9         1005        MOV   R1,A     ;SAVE ACCUMULATOR
                1006 ;
                1007 ; IF OVERFLOW CLR F1
                1008 ;
0421 2624       1009        JNO   LATCH
0423 A5         1010        CLR   F1
                1011 ;
                1012 ; NOW LATCH AND READ IN NEW PERIOD COUNT
                1013 ;
0424 9AFC       1014 LATCH: ANL   P2,#0FCH
```

```
0426 8A03      1015        ORL     P2,#03H   ;ADDRESS CONROL
0428 2380      1016        MOV     A,#80H
042A D48B      1017        CALL    CSON
042C 91        1018        MOVX    @R1,A     ;LATCH PERIOD COUNTER
042D 9AFE      1019        ANL     P2,#0FEH ;ADDRESS COUNTER 2
042F 81        1020        MOVX    A,@R1     ;READ COUNTER 2 LSB
0430 37        1021        CPL     A         ;SUBTRACT FROM 0FFH
0431 AC        1022        MOV     R4,A      ;STORE PERIOD COUNT
0432 81        1023        MOVX    A,@R1     ;READ COUNTER 2 MSB
0433 37        1024        CPL     A         ;SUBTRACT FROM 0FFH
0434 AD        1025        MOV     R5,A      ;STORE PERIOD COUNT
               1026 ;
               1027 ; NOW LOAD MODE WORD INTO COUNTER
               1028 ;
0435 D485      1029        CALL    SETC2
               1030 ;
               1031 ; NOW RELOAD COUNTER WITH DELAY FOR INTERRUPT
               1032 ; SERVICE TIME
               1033 ;
0437 9AFE      1034        ANL     P2,#0FEH
0439 23ED      1035        MOV     A,#0EDH   ;RELOAD LSB COUNT LESS DELAY
043B 91        1036        MOVX    @R1,A
043C 23FF      1037        MOV     A,#0FFH   ;RELOAD MSB COUNT
043E 91        1038        MOVX    @R1,A
043F D48E      1039        CALL    CSOFF
               1040 ;
               1041 ;  IF PROGRAM STACK IS POINTING AT CALL PERIOD
               1042 ;  INSTRUCTION THEN CHANGE STACK VALUE
               1043 ;
0441 B809      1044 CKSTAC: MOV    R0,#9
0443 F0        1045        MOV     A,@R0
0444 5307      1046        ANL     A,#07H
0446 D300      1047        XRL     A,#HIGH CALP
0448 9652      1048        JNZ     CKSM
044A C8        1049        DEC     R0
044B F0        1050        MOV     A,@R0
044C D37A      1051        XRL     A,#LOW CALP
044E 9652      1052        JNZ     CKSM
               1053 ;
               1054 ;  CHANGE ADDRESS IN STACK
               1055 ;
0450 B07C      1056        MOV     @R0,#LOW CALP+2
               1057 ;
               1058 ;  NOW CHECK FOR PERIOD TO SMALL I.E.(< 256)
               1059 ;  IF LESS THEN LOAD R3-4 FROM R6-7
               1060 ;
0452 FD        1061 CKSM:  MOV     A,R5
0453 9659      1062        JNZ     CKLV
0455 FE        1063        MOV     A,R6
0456 AC        1064        MOV     R4,A
0457 FF        1065        MOV     A,R7
0458 AD        1066        MOV     R5,A
               1067 ;
               1068 ;  FIRST RESET TIMER FLAG
               1069 ;
0459 00        1070 CKLV:  NOP
```

```
045A 00      1071         NOP
045B 00      1072         NOP
045C 165E    1073         JTF    NEX
             1074 ;
             1075 ;   SET NEW PERIOD FLAG
             1076 ;
045E B83C    1077 NEX:    MOV    R0,#3CH
0460 B001    1078         MOV    @R0,#1
             1079 ;
             1080 ;   IF F1 IS CLR THEN OVERFLOW ON COUNTER MAKE PERIOD FFFF
             1081 ;
0462 7669    1082 GO:     JF1    ARD
0464 23FF    1083         MOV    A,#0FFH
0466 AC      1084         MOV    R4,A
0467 AD      1085         MOV    R5,A
0468 B5      1086         CPL    F1
0469 9AF8    1087 ARD:    ANL    P2,#0F8H;RESET LEVEL DETECT AND COUNTER ADDRESS
046B 23FF    1088         MOV    A,#0FFH
046D 62      1089         MOV    T,A     ;RESET INTERRUPT COUNTER
046E F9      1090         MOV    A,R1    ;RESTORE ACCUMULATOR
046F C5      1091         SEL    RB0     ;RESTORE REGISTERS
0470 8A05    1092         ORL    P2,#05H
0472 93      1093         RETR           ;RETURN
             1094 ;****************************************************
             1095 ;
             1096 ;   THIS ROUTINE RECIPRICATES THE PERIOD AND FILTER #'S
             1097 ;
             1098 ;****************************************************
0473 B81E    1099 RECPD:  MOV    R0,#1EH ;GET PERIOD INFO
0475 BB00    1100         MOV    R3,#0   ;CLR LOW BYTE
0477 F0      1101         MOV    A,@R0   ;GET MB
0478 AC      1102         MOV    R4,A
0479 18      1103         INC    R0
047A F0      1104         MOV    A,@R0   ;GET MSB
047B AD      1105         MOV    R5,A
047C BA00    1106 RECOF:  MOV    R2,#0   ;CLR POWER REG.
             1107 ;
             1108 ;   IF NUMBER TO BE CONVERTED IS < 256 THEN MAKE 256
             1109 ;
047E FD      1110         MOV    A,R5
047F 9686    1111         JNZ    CK4
0481 27      1112         CLR    A
0482 AB      1113         MOV    R3,A
0483 AC      1114         MOV    R4,A
0484 17      1115         INC    A
0485 AD      1116         MOV    R5,A
             1117 ;
             1118 ;   NOW CHECK FOR BEING ABLE TO SHIFT 4 TIMES
             1119 ;
0486 53F0    1120 CK4:    ANL    A,#0F0H
0488 969B    1121         JNZ    SHF0    ;JMP IF < 4 SHIFTS
             1122 ;
             1123 ;   NOW SHIFT BY 4 TO THE LEFT
             1124 ;
048A B805    1125         MOV    R0,#5
048C FD      1126         MOV    A,R5
048D 47      1127         SWAP   A
```

```
048E AD      1128        MOV     R5,A
048F FC      1129        MOV     A,R4
0490 47      1130        SWAP    A
0491 30      1131        XCHD    A,@R0
0492 AC      1132        MOV     R4,A
0493 C8      1133        DEC     R0
0494 FB      1134        MOV     A,R3
0495 47      1135        SWAP    A
0496 30      1136        XCHD    A,@R0
0497 AB      1137        MOV     R3,A
0498 BA04    1138        MOV     R2,#4
049A FD      1139        MOV     A,R5
             1140 ;
             1141 ;   NOW SHIFT 1 AT A TIME TILL BIT7 = 1
             1142 ;
049B F2AA    1143 SHF0:  JB7     DONE    ;JMP IF LEFT JUSTIFIED
049D 1A      1144        INC     R2
049E 97      1145        CLR     C
049F FB      1146        MOV     A,R3
04A0 F7      1147        RLC     A
04A1 AB      1148        MOV     R3,A
04A2 FC      1149        MOV     A,R4
04A3 F7      1150        RLC     A
04A4 AC      1151        MOV     R4,A
04A5 FD      1152        MOV     A,R5
04A6 F7      1153        RLC     A
04A7 AD      1154        MOV     R5,A
04A8 849B    1155        JMP     SHF0
             1156 ;
             1157 ;   NOW GET READY TO GET # OUT OF TABLE
             1158 ;
04AA 97      1159 DONE:  CLR     C
04AB FD      1160        MOV     A,R5
04AC F7      1161        RLC     A       ;MULTIPLY BY 2 FOR
04AD AD      1162        MOV     R5,A    ;TWO BYTE TABLE
04AE 0300    1163        ADD     A,#LOW RTBL
04B0 E3      1164        MOVP3   A,@A
04B1 AF      1165        MOV     R7,A
04B2 2301    1166        MOV     A,#LOW RTBL+1
04B4 6D      1167        ADD     A,R5
04B5 E3      1168        MOVP3   A,@A
04B6 AE      1169        MOV     R6,A
04B7 531F    1170        ANL     A,#1FH  ;SAVE 5BIT ADDER
04B9 AB      1171        MOV     R3,A
04BA A400    1172        JMP     PAGE5
             1173 ;
             1174 ;
0500         1175        ORG     500H
             1176 ;
             1177 ;
             1178 ;   NOW DECIDE HOW MANY TIMES TO ADD THE ADDER
             1179 ;
0500 FC      1180 PAGE5: MOV     A,R4
0501 53E0    1181        ANL     A,#0E0H
0503 47      1182        SWAP    A
0504 77      1183        RR      A
0505 AC      1184        MOV     R4,A
```

```
0506 960E    1185        JNZ   ADDER
0508 FE      1186        MOV   A,R6
0509 53E0    1187        ANL   A,#0E0H  ;CLR ADDER BITS
050B AE      1188        MOV   R6,A
050C A41E    1189        JMP   ADD0
050E 27      1190 ADDER: CLR   A
050F 6B      1191 ADDR1: ADD   A,R3
0510 ECOF    1192        DJNZ  R4,ADDR1
0512 37      1193        CPL   A
0513 17      1194        INC   A
0514 AB      1195        MOV   R3,A
0515 FE      1196        MOV   A,R6
0516 53E0    1197        ANL   A,#0E0H  ;CLR ADDER BITS
0518 6B      1198        ADD   A,R3
0519 AE      1199        MOV   R6,A
051A 23FF    1200        MOV   A,#0FFH
051C 7F      1201        ADDC  A,R7
051D AF      1202        MOV   R7,A
051E BD00    1203 ADD0:  MOV   R5,#0    ;CLR LOW BYTE
             1204   ;
             1205   ; NOW ADJUST POWER REG. R2 FOR FINAL SHIFT
             1206   ;
0520 FA      1207        MOV   A,R2
0521 37      1208        CPL   A
0522 0307    1209        ADD   A,#7     ;7->6 IF 2'S COMP
0524 AA      1210        MOV   R2,A
0525 C64C    1211        JZ    DONE1    ;IF 0 NO SHIFTS
0527 E64D    1212        JNC   SL1      ;IF NC THEN #- SHIFT LEFT 1
             1213   ;
             1214   ; NOW CHECK FOR POSSIBLE SHIFT BY 4
             1215   ;
0529 03FC    1216        ADD   A,#-4
052B E640    1217        JNC   SHF1
             1218   ;
             1219   ; NOW SHIFT BY 4
             1220   ;
052D AA      1221        MOV   R2,A
052E B806    1222        MOV   R0,#6
0530 FD      1223        MOV   A,R5
0531 30      1224        XCHD  A,@R0
0532 47      1225        SWAP  A
0533 AD      1226        MOV   R5,A
0534 FE      1227        MOV   A,R6
0535 18      1228        INC   R0
0536 30      1229        XCHD  A,@R0
0537 47      1230        SWAP  A
0538 AE      1231        MOV   R6,A
0539 27      1232        CLR   A
053A 2F      1233        XCH   A,R7
053B 47      1234        SWAP  A
053C 30      1235        XCHD  A,@R0
053D FA      1236        MOV   A,R2
053E C64C    1237        JZ    DONE1
0540 97      1238 SHF1:  CLR   C
0541 FF      1239        MOV   A,R7
0542 67      1240        RRC   A
```

```
0543 AF        1241         MOV    R7,A
0544 FE        1242         MOV    A,R6
0545 67        1243         RRC    A
0546 AE        1244         MOV    R6,A
0547 FD        1245         MOV    A,R5
0548 67        1246         RRC    A
0549 AD        1247         MOV    R5,A
054A EA40      1248         DJNZ   R2,SHF1
054C 83        1249 DONE1:  RET
               1250 ;
054D 97        1251 SL1:    CLR    C
054E FD        1252         MOV    A,R5
054F F7        1253         RLC    A
0550 AD        1254         MOV    R5,A
0551 FE        1255         MOV    A,R6
0552 F7        1256         RLC    A
0553 AE        1257         MOV    R6,A
0554 FF        1258         MOV    A,R7
0555 F7        1259         RLC    A
0556 AF        1260         MOV    R7,A
0557 83        1261         RET
               1262 ;
               1263 ;   THIS IS USED TO KEEP FILTER VALUES BETWEEN 100H AND FFFFH
               1264 ;
0558 23FF      1265 MAKFF:  MOV    A,#0FFH
055A A0        1266         MOV    @R0,A
055B C8        1267         DEC    R0
055C A0        1268         MOV    @R0,A
055D C8        1269         DEC    R0
055E A0        1270         MOV    @R0,A
055F 83        1271 DUN:    RET
               1272 ;
               1273 ;
               1274 ;   SCALE IS USED TO SCALE DOWN THE OUTPUT FREQUENCY
               1275 ;   TO ONE OF 4 VALUES 1TO1-1TO.75-1TO.468-1TO.281
               1276 ;
0560 B826      1277 SCALE:  MOV    R0,#26H ;GET OUTPUT FILTER
0562 F0        1278         MOV    A,@R0
0563 AB        1279         MOV    R3,A
0564 18        1280         INC    R0
0565 F0        1281         MOV    A,@R0
0566 AC        1282         MOV    R4,A
0567 18        1283         INC    R0
0568 F0        1284         MOV    A,@R0
0569 AD        1285         MOV    R5,A
               1286 ;
               1287 ;   ALSO PUT OUTPUT FILTER VALUE IN R36-38
               1288 ;   THIS IS USED AS SCRATCH REGISTERS
               1289 ;
056A B836      1290         MOV    R0,#36H
056C FB        1291         MOV    A,R3
056D A0        1292         MOV    @R0,A
056E 18        1293         INC    R0
056F FC        1294         MOV    A,R4
0570 A0        1295         MOV    @R0,A
0571 18        1296         INC    R0
0572 FD        1297         MOV    A,R5
```

```
05/3 A0        1298          MOV     @R0,A
               1299 ;
               1300 ;   NOW CHECK FOR WHICH SCALE FACTOR IS SELECTED
               1301 ;       P1-3    P1-2    SCALE FACTOR
               1302 ;       0       0       1 TO 1
               1303 ;       0       1       1 TO .75
               1304 ;       1       0       1 TO .468
               1305 ;       1       1       1 TO .281
               1306 ;
0574 09        1307          IN      A,P1
0575 530C      1308          ANL     A,#0CH
0577 C6D2      1309          JZ      RET2        ;JMP IF 1 TO 1
0579 5299      1310          JB2     P75         ;JMP IF 1 TO .75
               1311 ;
               1312 ;   BIT 3 SET DO .468 SCALE FACTOR
               1313 ;
               1314 ;   FIRST GET 1/32 IN R36-38
               1315 ;
057B B838      1316 P468:    MOV     R0,#38H
057D B4D4      1317          CALL    SHIFR1
057F B836      1318          MOV     R0,#36H
0581 B4E1      1319          CALL    SHIFR4
               1320 ;
               1321 ;   NOW GET .5 OF R3-4-5
               1322 ;
0583 B805      1323          MOV     R0,#5
0585 B4D4      1324          CALL    SHIFR1
               1325 ;
               1326 ;   NOW ADD .5 TO COMPLEMENTED 1/32
               1327 ;
0587 B836      1328          MOV     R0,#36H
0589 F0        1329          MOV     A,@R0
058A 37        1330          CPL     A
058B 6B        1331          ADD     A,R3
058C AB        1332          MOV     R3,A
058D 18        1333          INC     R0
058E F0        1334          MOV     A,@R0
058F 37        1335          CPL     A
0590 7C        1336          ADDC    A,R4
0591 AC        1337          MOV     R4,A
0592 18        1338          INC     R0
0593 F0        1339          MOV     A,@R0
0594 37        1340          CPL     A
0595 7D        1341          ADDC    A,R5
0596 AD        1342          MOV     R5,A
0597 A4D2      1343          JMP     RET2
               1344 ;
               1345 ;   NOW DO .75 SCALE FACTOR UNLESS BIT 3 IS SET
               1346 ;   THEN DO .281
               1347 ;
0599 72B5      1348 P75:     JB3     P281
059B B805      1349          MOV     R0,#5
059D B4D4      1350          CALL    SHIFR1
059F B805      1351          MOV     R0,#5
05A1 B4D4      1352          CALL    SHIFR1
               1353 ;
```

```
                1354 ; GOT .25 NOW COMPLEMENT AND ADD TO OUTPUT
                1355 ; FILTER TO GET .75
                1356 ;
05A3 B826       1357      MOV   R0,#26H
05A5 FB         1358      MOV   A,R3
05A6 37         1359      CPL   A
05A7 60         1360      ADD   A,@R0
05A8 AB         1361      MOV   R3,A
05A9 18         1362      INC   R0
05AA FC         1363      MOV   A,R4
05AB 37         1364      CPL   A
05AC 70         1365      ADDC  A,@R0
05AD AC         1366      MOV   R4,A
05AE 18         1367      INC   R0
05AF FD         1368      MOV   A,R5
05B0 37         1369      CPL   A
05B1 70         1370      ADDC  A,@R0
05B2 AD         1371      MOV   R5,A
05B3 A4D2       1372      JMP   RET2
                1373 ;
                1374 ; NOW DO .281 SCALE FACTOR BY GETTING .25+(1/32)
                1375 ;
05B5 B838       1376 P281: MOV  R0,#38H
05B7 B4D4       1377      CALL  SHIFR1
05B9 B836       1378      MOV   R0,#36H
05BB B4E1       1379      CALL  SHIFR4
                1380 ;
                1381 ; GOT 1/32 IN R36-38
                1382 ; NOW GET .25 IN R3-5
                1383 ;
05BD B805       1384      MOV   R0,#5
05BF B4D4       1385      CALL  SHIFR1
05C1 B805       1386      MOV   R0,#5
05C3 B4D4       1387      CALL  SHIFR1
                1388 ;
                1389 ; NOW ADD .25 AND 1/32
                1390 ;
05C5 B836       1391      MOV   R0,#36H
05C7 F0         1392      MOV   A,@R0
05C8 6B         1393      ADD   A,R3
05C9 AB         1394      MOV   R3,A
05CA 18         1395      INC   R0
05CB F0         1396      MOV   A,@R0
05CC 7C         1397      ADDC  A,R4
05CD AC         1398      MOV   R4,A
05CE 18         1399      INC   R0
05CF F0         1400      MOV   A,@R0
05D0 7D         1401      ADDC  A,R5
05D1 AD         1402      MOV   R5,A
05D2 847C       1403 RET2: JMP  RECOF
                1404 ;
                1405 ;
                1406 ; SHIFR1 IS A ROUTINE THAT SHIFTS 3 REGISTERS
                1407 ; RIGHT 1 PLACE.  R0 MUST BE POINTING AT MSB.
                1408 ;
05D4 97         1409 SHIFR1: CLR C
```

```
05D5 F0         1410         MOV     A,@R0
05D6 67         1411         RRC     A
05D7 A0         1412         MOV     @R0,A
05D8 C8         1413         DEC     R0
05D9 F0         1414         MOV     A,@R0
05DA 67         1415         RRC     A
05DB A0         1416         MOV     @R0,A
05DC C8         1417         DEC     R0
05DD F0         1418         MOV     A,@R0
05DE 67         1419         RRC     A
05DF A0         1420         MOV     @R0,A
05E0 83         1421         RET
                1422 ;
                1423 ;    SHIFR4 IS A ROUTINE THAT SHIFTS 3 REGISTERS
                1424 ;    RIGHT 4 PLACES.  R0 MUST POINT AT LSB.
                1425 ;
05E1 F0         1426 SHIFR4: MOV    A,@R0
05E2 18         1427         INC     R0
05E3 30         1428         XCHD    A,@R0
05E4 47         1429         SWAP    A
05E5 C8         1430         DEC     R0
05E6 A0         1431         MOV     @R0,A
05E7 18         1432         INC     R0
05E8 F0         1433         MOV     A,@R0
05E9 18         1434         INC     R0
05EA 30         1435         XCHD    A,@R0
05EB 47         1436         SWAP    A
05EC C8         1437         DEC     R0
05ED A0         1438         MOV     @R0,A
05EE 18         1439         INC     R0
05EF F0         1440         MOV     A,@R0
05F0 47         1441         SWAP    A
05F1 530F       1442         ANL     A,#0FH
05F3 A0         1443         MOV     @R0,A
05F4 83         1444         RET
                1445 ;
                1446 ;
0600            1447         ORG     600H
                1448 ;
                1449 ;
                1450 ;    STOP IS A ROUTINE USED TO TRY AND STOP
                1451 ;    FALSE STARTS DO TO VIBRATION AND OTHER
                1452 ;    ERRONIOUS SIGNALS
                1453 ;
0600 9AD7       1454 STPOUT: ANL    P2,#0D7H;DISABLE OUTPUT&GAIN LOW
                1455 ;
                1456 ;   NOW SET OUTPUT FILTER TO DEFAULT (15HZ)
                1457 ;
0602 B826       1458         MOV     R0,#26H
0604 B000       1459         MOV     @R0,#0
0606 18         1460         INC     R0
0607 B080       1461         MOV     @R0,#080H
0609 18         1462         INC     R0
060A B001       1463         MOV     @R0,#1
                1464 ;
                1465 ;   SET FAST MODE
                1466 ;
```

```
060C 85      1467         CLR    F0
060D 95      1468         CPL    F0
             1469 ;
             1470 ;  IF SUPER FAST FILTER IS SELECTED THEN RETURN
             1471 ;
060E 09      1472         IN     A,P1
060F 5303    1473         ANL    A,#3
0611 03FD    1474         ADD    A,#-3
0613 9617    1475         JNZ    OVF      ;JMP IF NOT SELECTED
0615 C464    1476         JMP    CLRSTP
             1477 ;
             1478 ;  IS PERIOD OVERFLOW SET
             1479 ;
0617 366A    1480 OVF:    JT0    CLRCTR   ;JMP IF SET
             1481 ;
             1482 ;  IS NEW PERIOD FLAG SET
             1483 ;
0619 B83C    1484         MOV    R0,#3CH
061B F0      1485         MOV    A,@R0
061C C670    1486         JZ     RETURN   ;JMP IF NOT SET
061E B000    1487         MOV    @R0,#0   ;CLR NEW PERIOD FLAG
             1488 ;
             1489 ;  NEW PERIOD FLAG SET SO DO STOPPED ROUTINE
             1490 ;
             1491 ;  NOW GET 7/8 OLD PERIOD TO ADD TO COMP NEW
             1492 ;
0620 B81F    1493         MOV    R0,#1FH  ;I IRST GET 1/8 NEW
0622 97      1494         CLR    C
0623 F0      1495         MOV    A,@R0
0624 67      1496         RRC    A
0625 AD      1497         MOV    R5,A
0626 C8      1498         DEC    R0
0627 F0      1499         MOV    A,@R0
0628 67      1500         RRC    A
0629 AC      1501         MOV    R4,A     ;NEW/2
             1502 ;
062A 97      1503         CLR    C
062B FD      1504         MOV    A,R5
062C 67      1505         RRC    A
062D AD      1506         MOV    R5,A
062E FC      1507         MOV    A,R4
062F 67      1508         RRC    A
0630 AC      1509         MOV    R4,A     ;NEW/4
             1510 ;
0631 97      1511         CLR    C
0632 FD      1512         MOV    A,R5
0633 67      1513         RRC    A
0634 37      1514         CPL    A
0635 AD      1515         MOV    R5,A
0636 FC      1516         MOV    A,R4
0637 67      1517         RRC    A
0638 37      1518         CPL    A        ;NEW/8 AND COMPLEMENTED
             1519 ;
0639 60      1520         ADD    A,@R0
063A AC      1521         MOV    R4,A
063B 18      1522         INC    R0
063C FD      1523         MOV    A,R5
```

```
063D 70      1524       ADDC   A,@R0
063E AD      1525       MOV    R5,A      ;NEW-1/8NEW=7/8NEW
             1526 ;
             1527 ;  NOW DO 2'S COMP ON 7/8 NEW
             1528 ;
063F FC      1529       MOV    A,R4
0640 37      1530       CPL    A
0641 0301    1531       ADD    A,#1
0643 AC      1532       MOV    R4,A
0644 FD      1533       MOV    A,R5
0645 37      1534       CPL    A
0646 1300    1535       ADDC   A,#0
0648 AD      1536       MOV    R5,A
             1537 ;
             1538 ;  NOW TAKE OLD-7/8NEW AND CHECK FOR POSITIVE RESULT
             1539 ;
0649 B830    1540       MOV    R0,#30H
064B F0      1541       MOV    A,@R0
064C 6C      1542       ADD    A,R4
064D 18      1543       INC    R0
064E F0      1544       MOV    A,@R0
064F 7D      1545       ADDC   A,R5
             1546 ;
             1547 ;  IS RESULT POSITIVE
             1548 ;
0650 E655    1549       JNC    INCT      ;JMP IF NEGATIVE
             1550 ;
             1551 ;  NOW INC #POS SUMS CNTR
             1552 ;
0652 B834    1553       MOV    R0,#34H
0654 10      1554       INC    @R0
             1555 ;
             1556 ;  NOW INC TOTAL SUMS CNTR
             1557 ;
0655 B835    1558 INCT: MOV    R0,#35H
0657 10      1559       INC    @R0
             1560 ;
             1561 ;  CHECK FOR TOTAL > 32
             1562 ;
0658 F0      1563       MOV    A,@R0
0659 03E0    1564       ADD    A,#-32
065B E670    1565       JNC    RETURN    ;JMP IF < 32
             1566 ;
             1567 ;  NOW CHECK IF ALL CONDITIONS FOR
             1568 ;  STARTUP HAVE OCCURED
             1569 ;
             1570 ;  NOW CHECK FOR > 80% POSITIVE RESULTS
             1571 ;
065D B834    1572       MOV    R0,#34H
065F F0      1573       MOV    A,@R0
0660 03E7    1574       ADD    A,#-25
0662 E66A    1575       JNC    CLRCTR    ;JMP IF LESS<80% POS
             1576 ;
             1577 ;  NOW CLR STOP FLAG AND ENABLE OUTPUT
             1578 ;
0664 B83D    1579 CLRSTP: MOV  R0,#3DH   ;CLEAR STOPPED FLAG
0666 B000    1580       MOV    @R0,#0
```

```
0668 8A08       1581            ORL     P2,#08H ;ENABLE OUTPUT COUNTER
                1582 ;
                1583 ;  NOW CLR ALL COUNTERS
                1584 ;
066A 27         1585 CLRCTR: CLR     A
066B B834       1586            MOV     R0,#34H
066D A0         1587            MOV     @R0,A   ;CLR POS SUMS CNTR
066E 18         1588            INC     R0
066F A0         1589            MOV     @R0,A   ;CLR TOTAL SUMS CNTR
                1590 ;
                1591 ;  NOW RETURN FROM SUBROUTINE
                1592 ;
0670 83         1593 RETURN: RET
                1594 ;
                1595 ;   SETC0,SETC1 AND SETC2 ARE ROUTINES THAT SETUP
                1596 ;   OR INITALIZE THE COUNTERS OF THE 8253
                1597 ;
                1598 ;   SETUP COUNTER 0
                1599 ;
0671 8A03       1600 SETC0:  ORL     P2,#03H
0673 2330       1601            MOV     A,#30H
0675 90         1602            MOVX    @R0,A
0676 9AFC       1603            ANL     P2,#0FCH
0678 23EB       1604            MOV     A,#0EBH
067A 90         1605            MOVX    @R0,A
067B 2304       1606            MOV     A,#4H
067D 90         1607            MOVX    @R0,A
067E 83         1608            RET
                1609 ;
                1610 ;  SETUP COUNTER 1
                1611 ;
067F 8A03       1612 SETC1:  ORL     P2,#3H
0681 2376       1613            MOV     A,#76H
0683 90         1614            MOVX    @R0,A
0684 83         1615            RET
                1616 ;
                1617 ;  SETUP COUNTER 2
                1618 ;
0685 8A03       1619 SETC2:  ORL     P2,#3H
0687 23B0       1620            MOV     A,#0B0H
0689 90         1621            MOVX    @R0,A
068A 83         1622            RET
                1623 ;
                1624 ;   CSON ENABLES 8253
                1625 ;
068B 99BF       1626 CSON:   ANL     P1,#0BFH
068D 83         1627            RET
                1628 ;
                1629 ;   CSOFF DISABLES 8253
                1630 ;
068E 8940       1631 CSOFF:  ORL     P1,#40H
0690 83         1632            RET
                1633 ;
                1634 ;   CK75 CHECKS OUTPUT FILTER VALUE FOR
                1635 ;   GREATER THAN 75HZ IF IT IS GREATER IT
                1636 ;   SETS GAIN HIGH ELSE IT SETS IT LOW.
                1637 ;
```

```
0691 B828   1638 CK75:   MOV   R0,#28H  ;MSD OUTPUT FILTER
0693 F0     1639         MOV   A,@R0
0694 C6A4   1640         JZ    LG       ;JMP IF <75HZ
0696 03F9   1641         ADD   A,#-7
0698 C69E   1642         JZ    CKLSB    ;JMP IF =7
069A E6A4   1643         JNC   LG       ;JMP IF <75HZ
069C C4A7   1644         JMP   HG       ;JMP IF >75HZ
069E C8     1645 CKLSB:  DEC   R0       ;LSD OUTPUT FILTER
069F F0     1646         MOV   A,@R0
06A0 03A1   1647         ADD   A,#-5FH
06A2 F6A7   1648         JC    HG       ;JMP IF >75HZ
06A4 9ADF   1649 LG:     ANL   P2,#0DFH
06A6 83     1650         RET
06A7 8A20   1651 HG:     ORL   P2,#20H
06A9 83     1652         RET
            1653 ;
            1654 ;
0700        1655         ORG   700H
            1656 ;
            1657 ;
            1658 ;   NOW DO SUPER FAST INPUT FILTER ROUTINE
            1659 ;
            1660 ;   FIRST SET FAST FLAG
            1661 ;
0700 85     1662 SUPER:  CLR   F0
0701 95     1663         CPL   F0
            1664 ;
            1665 ;   NOW GET 7/8 OLD + 1/8 NEW AND PUT IN FAST FILTER
            1666 ;
            1667 ;   FIRST GET 7/8 OLD
            1668 ;
0702 B822   1669         MOV   R0,#22H
0704 97     1670         CLR   C
0705 F0     1671         MOV   A,@R0
0706 AC     1672         MOV   R4,A
0707 C8     1673         DEC   R0
0708 F0     1674         MOV   A,@R0
0709 AB     1675         MOV   R3,A
070A C8     1676         DEC   R0
070B F0     1677         MOV   A,@R0
070C AA     1678         MOV   R2,A
            1679 ;
            1680 ;   OLD IN REG. 2,3,4   NOW GET 1/8 OLD
            1681 ;
070D B804   1682         MOV   R0,#4
070F B4D4   1683         CALL  SHIFR1
0711 B804   1684         MOV   R0,#4
0713 B4D4   1685         CALL  SHIFR1
0715 B804   1686         MOV   R0,#4
0717 B4D4   1687         CALL  SHIFR1
            1688 ;
            1689 ;   NOW COMPLEMENT 1/8 OLD AND ADD TO OLD = 7/8 OLD
            1690 ;
0719 B820   1691         MOV   R0,#20H
071B FA     1692         MOV   A,R2
071C 37     1693         CPL   A
071D 60     1694         ADD   A,@R0
```

```
071E 18         1695            INC     R0
071F AA         1696            MOV     R2,A
0720 FB         1697            MOV     A,R3
0721 37         1698            CPL     A
0722 70         1699            ADDC    A,@R0
0723 18         1700            INC     R0
0724 AB         1701            MOV     R3,A
0725 FC         1702            MOV     A,R4
0726 37         1703            CPL     A
0727 70         1704            ADDC    A,@R0
0728 AC         1705            MOV     R4,A
                1706 ;
                1707 ;  NOW GET 1/8 NEW TO ADD TO 7/8 OLD
                1708 ;
0729 B807       1709            MOV     R0,#7
072B B4D4       1710            CALL    SHIFR1
072D B807       1711            MOV     R0,#7
072F B4D4       1712            CALL    SHIFR1
0731 B807       1713            MOV     R0,#7
0733 B4D4       1714            CALL    SHIFR1
                1715 ;
                1716 ;  NOW ADD
                1717 ;
0735 B820       1718            MOV     R0,#20H
0737 FA         1719            MOV     A,R2
0738 6D         1720            ADD     A,R5
0739 A0         1721            MOV     @R0,A
073A 18         1722            INC     R0
073B FB         1723            MOV     A,R3
073C 7E         1724            ADDC    A,R6
073D A0         1725            MOV     @R0,A
073E 18         1726            INC     R0
073F FC         1727            MOV     A,R4
0740 7F         1728            ADDC    A,R7
0741 A0         1729            MOV     @R0,A
                1730 ;
                1731 ;  CHECK FOR OVERFLOW (MAKE FFFFFF)
                1732 ;
0742 E646       1733            JNC     RT
0744 B458       1734            CALL    MAKFF
0746 24CA       1735 RT:        JMP     WINDOW
                1736 ;
                1737 ;
                1738 ;  NOW DO SUPER FAST FILTER FOR OUTPUT FILTER
                1739 ;
0748 B829       1740 SUPER1:    MOV     R0,#29H
074A F0         1741            MOV     A,@R0
074B 18         1742            INC     R0
074C AD         1743            MOV     R5,A
074D F0         1744            MOV     A,@R0
074E 18         1745            INC     R0
074F AE         1746            MOV     R6,A
0750 F0         1747            MOV     A,@R0
0751 AF         1748            MOV     R7,A
                1749 ;
                1750 ;  FIRST GET 7/8 OLD
```

```
                1751 ;
0752 B828      1752       MOV    R0,#28H
0754 97        1753       CLR    C
0755 F0        1754       MOV    A,@R0
0756 AC        1755       MOV    R4,A
0757 C8        1756       DEC    R0
0758 F0        1757       MOV    A,@R0
0759 AB        1758       MOV    R3,A
075A C8        1759       DEC    R0
075B F0        1760       MOV    A,@R0
075C AA        1761       MOV    R2,A
                1762 ;
                1763 ;    OLD IN REG. 2,3,4   NOW GET 1/8 OLD
                1764 ;
075D B804      1765       MOV    R0,#4
075F B4D4      1766       CALL   SHIFR1
0761 B804      1767       MOV    R0,#4
0763 B4D4      1768       CALL   SHIFR1
0765 B804      1769       MOV    R0,#4
0767 B4D4      1770       CALL   SHIFR1
                1771 ;
                1772 ;    NOW COMPLEMENT 1/8 OLD AND ADD TO OLD = 7/8 OLD
                1773 ;
0769 B826      1774       MOV    R0,#26H
076B FA        1775       MOV    A,R2
076C 37        1776       CPL    A
076D 60        1777       ADD    A,@R0
076E 18        1778       INC    R0
076F AA        1779       MOV    R2,A
0770 FB        1780       MOV    A,R3
0771 37        1781       CPL    A
0772 70        1782       ADDC   A,@R0
0773 18        1783       INC    R0
0774 AB        1784       MOV    R3,A
0775 FC        1785       MOV    A,R4
0776 37        1786       CPL    A
0777 70        1787       ADDC   A,@R0
0778 AC        1788       MOV    R4,A
                1789 ;
                1790 ;    NOW GET 1/8 NEW TO ADD TO 7/8 OLD
                1791 ;
0779 B807      1792       MOV    R0,#7
077B B4D4      1793       CALL   SHIFR1
077D B807      1794       MOV    R0,#7
077F B4D4      1795       CALL   SHIFR1
0781 B807      1796       MOV    R0,#7
0783 B4D4      1797       CALL   SHIFR1
                1798 ;
                1799 ;    NOW ADD
                1800 ;
0785 B826      1801       MOV    R0,#26H
0787 FA        1802       MOV    A,R2
0788 6D        1803       ADD    A,R5
0789 A0        1804       MOV    @R0,A
078A 18        1805       INC    R0
078B FB        1806       MOV    A,R3
078C 7E        1807       ADDC   A,R6
```

```
078D A0        1808         MOV    @R0,A
078E 18        1809         INC    R0
078F FC        1810         MOV    A,R4
0790 7F        1811         ADDC   A,R7
0791 A0        1812         MOV    @R0,A
               1813 ;
               1814 ; CHECK FOR OVERFLOW (MAKE FFFFFF)
               1815 ;
0792 E696      1816         JNC    RT1
0794 B458      1817         CALL   MAKFF
0796 44CF      1818 RT1:    JMP    OUTPUT
               1819 ;
               1820 ;
0300           1821         ORG    300H
               1822 ;
               1823 ; RTBL IS A TABLE OF RECIPRICAL NUMBERS USED
               1824 ; TO CONVERT PERIODS TO FREQUENCY AND BACK
               1825 ;
0300 7FFC      1826 RTBL:   DW     32764
0302 7F1F      1827         DW     32543
0304 7E1F      1828         DW     32287   ;130
0306 7D1F      1829         DW     32031
0308 7C1C      1830         DW     31772
030A 7B3C      1831         DW     31548
030C 7A5F      1832         DW     31327
030E 795C      1833         DW     31068
0310 787C      1834         DW     30844
0312 7798      1835         DW     30616
0314 76DC      1836         DW     30423
0316 75FC      1837         DW     30204
0318 751C      1838         DW     29980   ;140
031A 7438      1839         DW     29752
031C 737C      1840         DW     29564
031E 7298      1841         DW     29336
0320 71D8      1842         DW     29144
0322 7118      1843         DW     28952
0324 705C      1844         DW     28764
0326 6F78      1845         DW     28536
0328 6EB8      1846         DW     28344
032A 6DF4      1847         DW     28148
032C 6D58      1848         DW     27992   ;150
032E 6C98      1849         DW     27800
0330 6BD8      1850         DW     27608
0332 6B14      1851         DW     27412
0334 6A78      1852         DW     27256
0336 69B4      1853         DW     27060
0338 6914      1854         DW     26900
033A 6878      1855         DW     26744
033C 67B4      1856         DW     26548
033E 6714      1857         DW     26388
0340 6674      1858         DW     26228   ;160
0342 65D4      1859         DW     26068
0344 6534      1860         DW     25908
0346 6494      1861         DW     25748
0348 63F4      1862         DW     25588
034A 6354      1863         DW     25428
```

| | | | | |
|---|---|---|---|---|
| 034C 62B0 | 1864 | DW | 25264 | |
| 034E 6234 | 1865 | DW | 25140 | |
| 0350 6194 | 1866 | DW | 24980 | |
| 0352 60F0 | 1867 | DW | 24816 | |
| 0354 6074 | 1868 | DW | 24692 | |
| 0356 5FD0 | 1869 | DW | 24528 | |
| 0358 5F54 | 1870 | DW | 24404 | |
| 035A 5ED0 | 1871 | DW | 24240 | |
| 035C 5E30 | 1872 | DW | 24112 | |
| 035E 5D84 | 1873 | DW | 23988 | |
| 0360 5D10 | 1874 | DW | 23824 | |
| 0362 5C90 | 1875 | DW | 23696 | |
| 0364 5C10 | 1876 | DW | 23568 | |
| 0366 5B90 | 1877 | DW | 23440 | |
| 0368 5B10 | 1878 | DW | 23312 | ;180 |
| 036A 5A90 | 1879 | DW | 23184 | |
| 036C 5A10 | 1880 | DW | 23056 | |
| 036E 5990 | 1881 | DW | 22928 | |
| 0370 5910 | 1882 | DW | 22800 | |
| 0372 5890 | 1883 | DW | 22672 | |
| 0374 580C | 1884 | DW | 22540 | |
| 0376 57E0 | 1885 | DW | 22448 | |
| 0378 5730 | 1886 | DW | 22320 | |
| 037A 56AC | 1887 | DW | 22188 | |
| 037C 5650 | 1888 | DW | 22096 | ;190 |
| 037E 55D0 | 1889 | DW | 21968 | |
| 0380 554C | 1890 | DW | 21836 | |
| 0382 54F0 | 1891 | DW | 21744 | |
| 0384 546C | 1892 | DW | 21612 | |
| 0386 540C | 1893 | DW | 21516 | |
| 0388 53B0 | 1894 | DW | 21424 | |
| 038A 532C | 1895 | DW | 21292 | |
| 038C 52CC | 1896 | DW | 21196 | |
| 038E 5270 | 1897 | DW | 21104 | |
| 0390 51EC | 1898 | DW | 20972 | ;200 |
| 0392 518C | 1899 | DW | 20876 | |
| 0394 512C | 1900 | DW | 20780 | |
| 0396 50D0 | 1901 | DW | 20688 | |
| 0398 504C | 1902 | DW | 20556 | |
| 039A 4FEC | 1903 | DW | 20460 | |
| 039C 4F8C | 1904 | DW | 20364 | |
| 039E 4F2C | 1905 | DW | 20268 | |
| 03A0 4ECC | 1906 | DW | 20172 | |
| 03A2 4E6C | 1907 | DW | 20076 | |
| 03A4 4E0C | 1908 | DW | 19980 | ;210 |
| 03A6 4DAC | 1909 | DW | 19884 | |
| 03A8 4D4C | 1910 | DW | 19788 | |
| 03AA 4CEC | 1911 | DW | 19692 | |
| 03AC 4C88 | 1912 | DW | 19592 | |
| 03AE 4C4C | 1913 | DW | 19532 | |
| 03B0 4BEC | 1914 | DW | 19436 | |
| 03B2 4B8C | 1915 | DW | 19340 | |
| 03B4 4B2C | 1916 | DW | 19244 | |
| 03B6 4AC8 | 1917 | DW | 19144 | |
| 03B8 4A6C | 1918 | DW | 19084 | ;220 |
| 03BA 4A2C | 1919 | DW | 18988 | |
| 03BC 49C8 | 1920 | DW | 18888 | |

```
03BE 498C      1921      DW    18828
03C0 492C      1922      DW    18732
03C2 48C8      1923      DW    18632
03C4 488C      1924      DW    18572
03C6 4828      1925      DW    18472
03C8 47EC      1926      DW    18412
03CA 4788      1927      DW    18312
03CC 474C      1928      DW    18252    ;230
03CE 46E8      1929      DW    18152
03D0 46AC      1930      DW    18092
03D2 4648      1931      DW    17992
03D4 460C      1932      DW    17928
03D6 45CC      1933      DW    17868
03D8 4568      1934      DW    17768
03DA 4528      1935      DW    17704
03DC 44EC      1936      DW    17644
03DE 4488      1937      DW    17544
03E0 4448      1938      DW    17480    ;240
03E2 440C      1939      DW    17416
03E4 43CC      1940      DW    17356
03E6 4368      1941      DW    17256
03E8 4328      1942      DW    17192
03EA 42E8      1943      DW    17128
03EC 42A8      1944      DW    17064
03EE 426C      1945      DW    17004
03F0 420C      1946      DW    16904
03F2 41C8      1947      DW    16840
03F4 4188      1948      DW    16776    ;250
03F6 4148      1949      DW    16712
03F8 410C      1950      DW    16648
03FA 40C8      1951      DW    16584
03FC 4088      1952      DW    16520
03FE 4048      1953      DW    16456
               1954 ;
               1955      END
```

USER SYMBOLS
| | | | | | | | | | | | | | | |
|---|---|---|---|---|---|---|---|---|---|---|---|---|---|---|
| ADD0 | 051E | ADDER | 050E | ADDR1 | 050F | ARD | 0469 | BACK | 017A | BKUP1 | 002F | CALP | 007A | CK4 | 0486 |
| CK75 | 0691 | CKAG | 02E5 | CKAG1 | 0410 | CKF0 | 022E | CKLOW | 01F9 | CKLSB | 069E | CKLV | 0459 | CKSAME | 01C1 |
| CKSM | 0452 | CKSTAC | 0441 | CLRCTR | 066A | CLRSTP | 0664 | CNTRL | 0136 | COM | 0066 | CSUFF | 068E | CSON | 068B |
| DONE | 04AA | DONE1 | 054C | DSABLE | 02E1 | DUN | 055F | FAST | 0225 | FAST2 | 0232 | FAST1 | 00A4 | FILTER | 007C |
| GETPD | 01D0 | GETR | 008F | GO | 0462 | HG | 06A7 | INCT | 0655 | INITAL | 0009 | LATCH | 0424 | LG | 06A4 |
| MAIN | 0054 | MAIN1 | 0419 | MAKFF | 0558 | MAN1 | 0056 | MARK | 0181 | MARK2 | 01BA | MIN50 | 020B | NEX | 045E |
| OUT1 | 0058 | OUTPUT | 02CF | OVF | 0617 | P281 | 05B5 | P468 | 057B | P75 | 0599 | PAGE1 | 0100 | PAGE2 | 0200 |
| PAGE4 | 0400 | PAGE5 | 0500 | PERIOD | 041F | PLS50 | 01DF | RECOF | 047C | RECPD | 0473 | REJECT | 0223 | RET2 | 05D2 |
| RETURN | 0670 | RT | 0746 | R11 | 0796 | RTBL | 0300 | SCALE | 0560 | SE11 | 01C9 | SETC0 | 0671 | SETC1 | 067F |
| SETC2 | 0685 | SETF0 | 01C4 | SHF0 | 049B | SHF1 | 0540 | SHIFR1 | 05D4 | SHIFR4 | 05E1 | SKIP1 | 00C7 | SKIP2 | 00F1 |
| SKIP3 | 0255 | SKIP4 | 027F | SL1 | 054D | SLOFLT | 010C | SLOW | 0291 | STPOUT | 0600 | SUPER | 0700 | SUPER1 | 0748 |
| WINDOW | 01CA | | | | | | | | | | | | | | |

ASSEMBLY COMPLETE, NO ERRORS

The invention is claimed as follows:

1. A digital tracking, variable Q bandpass filter apparatus for digitally processing doppler variations in an IF signal from a doppler radar transceiver representing the velocity of a vehicle or other object and comprising: period counter means responsive to said IF signal for developing a digital period signal corresponding to the period of each of selected cycles of said IF signal to thereby convert the IF signal from the time domain to the frequency domain, and low pass filter means having a selectable effective corner frequency and coupled for response to said digital period signal for producing a filtered signal which substantially follows said digital period signal thereby substantially simultaneously tracking and filtering said IF signal.

2. Apparatus according to claim 1 and further including conversion means for converting said filtered signal into a display signal having a value corresponding to the frequency of said IF signal.

3. Apparatus according to claim 2 wherein said radar transceiver comprises a doppler radar for determining the speed of a moving body and wherein said converting means further comprises calculating means responsive to said filtered signal for producing a display signal corresponding to the speed of said moving body in accordance with the value of the IF doppler signal produced by said radar transceiver in response thereto.

4. Apparatus according to claim 1 wherein said low pass filter means comprises a digital low pass filter having a controllable effective corner frequency and further including corner frequency control means coupled with said period counter means and with said digital low pass filter for controllably varying said effective corner frequency in a predetermined fashion in accordance with the amount of variation in said digital period signal from one selected cycle to a successive selected cycle, thereby substantially tracking said digital period signal.

5. Apparatus according to claim 4 wherein said corner frequency control means comprises sampling means interposed between said period counter means and said digital low pass filter for periodically sampling said digital period signals.

6. Apparatus according to claim 5 and further comprising inverting means interposed between said sampling means and said digital low pass filter for converting each sampled digital period signal into a digital frequency-related signal.

7. Apparatus according to claim 6 wherein said digital low pass filter comprises filtering means responsive substantially only to ones of said digital frequency-related signals which are within said effective corner frequency for producing said filtered signals comprising signals substantially the same as said digital frequency-related signals which are within said selected corner frequency thereby simultaneously tracking and filtering said digital frequency-related signals.

8. Apparatus according to claim 4 wherein said digital low pass filter further operates in accordance with a preselected transfer function which defines the effective corner frequency thereof and wherein said corner frequency control means is operative for varying said transfer function in a predetermined fashion.

9. Apparatus according to claim 6 wherein said corner frequency control means further comprises at least two reference low pass filters coupled to receive said digital frequency-related signals and each having a predetermined, but different effective corner frequency and comparing means responsive to the variation between the outputs of said reference low pass filters for controlling the variations in the effective corner frequency of said digital low pass filter.

10. Apparatus according to claim 9 wherein each of said reference low pass filters comprises a digital filter.

11. Apparatus according to claim 9 and further including window means interposed between said digital low pass filter and said inverting means for rejecting signals from said inverting means which vary by more than a predetermined amount from the output produced in response thereto by a selected one of said reference low pass filters.

12. Apparatus according to claim 9 wherein said comparing means further includes selecting means for selecting the output of one of said reference low pass filters for use by said window means.

13. Apparatus according to claim 12 wherein said selecting means is further operative for selecting the effective corner frequency of one of said reference low pass filters as the effective corner frequency of said digital low pass filter.

14. Apparatus according to claim 13 wherein said selecting means is responsive to said comparing means for selecting the output and the effective corner frequency of the one of said reference filters having the lower effective corner frequency when the variation between the output signals produced by said reference low pass filters is less than a predetermined amount and for selecting the output and effective corner frequency of the one of said reference low pass filters having the higher effective corner frequency when said variation is greater than or equal to said predetermined amount.

15. Apparatus according to claim 1 wherein said low pass filter comprises a digital filter including register means for storing a sample value of a digital input signal; and calculating means for producing said sample value in accordance with a predetermined transfer function comprising the sum of a first proportion of a previously stored sample value added to a second proportion of the present value of said digital input signal, and selecting means responsive to predetermined control signals for selecting said first and second proportions; said sample value comprising said filtered signal.

16. Apparatus according to claim 15 and further including transfer function control means responsive to said digital input signal for producing said predetermined control signals.

17. Apparatus according to claim 16 wherein said transfer function control means comprises at least two reference filters each comprising a digital filter operating upon a digital input signal in accordance with substantially the same form of transfer function to said first digital filter and each having different preselected first and second proportions associated with said transfer function; and comparing means for comparing the stored sample values of said reference filters and for producing said predetermined control signals for causing selection of the preselected proportions of one of said reference filters by said digital filter selecting means in accordance with the variation between said reference filter sample values.

18. Apparatus according to claim 17 and further including inverting means interposed between said period counter means and both said digital filter means and said transfer function control means for converting said digital period signals to digital frequency-related signals to comprise the digital input signal to both of said digital filter and said transfer function control means.

19. Apparatus according to claim 18 and further including window means for rejecting any digital frequency-related signal which varies from the output produced in response thereto by a selected one of said reference filters by more than a predetermined amount.

20. Apparatus according to claim 17 wherein said selecting means is responsive to said comparing means for selecting the preselected proportions of the one of said reference filters having a lower effective corner frequency when the variation between the output signals produced by said reference low pass filters is less than a predetermined amount and for selecting the output and the preselected proportions of the one of said reference low pass filters having a higher effective corner frequency when said variation is greater than or equal to said predetermined amount.

21. Apparatus according to claim 20 wherein said comparing means further includes means for delivering the output signals of the one of said reference filters whose preselected proportions are selected for use to said window means.

22. A doppler radar apparatus mountable to a vehicle for determining the horizontal velocity thereof, and comprising radar transceiver means for transmitting and receiving, respectively, doppler-shifted radar signals; said radar transceiver means including a local oscillator for producing a local oscillator signal, and mixer means for mixing said received signals with said local oscillator signal to produce a predetermined IF signal; tracking bandpass filter means responsive to said IF signal for producing a filtered signal corresponding substantially only to that portion of the received doppler-shifted signal corresponding to said horizontal velocity; switchable power supply means for said radar transceiver means; and control circuit means responsive to a first predetermined control signal for switching said switchable power supply means to an inactive condition, thereby removing power from said radar transceiver means; and further including minimum velocity sensor means responsive to the velocity of said vehicle falling below a predetermined minimum velocity for producing said first predetermined control signal.

23. Apparatus according to claim 22 wherein said band pass filter means further includes output switching means for selectively delivering or withholding said filtered signal from an output utilization means; and control means responsive to a second predetermined control signal for activating said switching means to withhold said filtered signal from said output utilization means.

24. A digitally implemented tracking, variable Q bandpass filtering method for processing doppler variations in an IF signal from a doppler radar transceiver representing the velocity of a vehicle or other object and comprising: developing a digital period signal corresponding to the period of each of selected cycles of said IF signal to thereby convert the IF signal from the time domain to the frequency domain; subjecting said digital period signal to low pass filtering; controlling the effective corner frequency of said low pass filtering in accordance with the amount of variation in said digital period signal from one selected cycle to a successive selected cycle for producing a filtered signal which substantially follows said digital period signal, thereby substantially simultaneously tracking and filtering said IF signal.

25. A method according to claim 24 wherein the step of low pass filtering comprises a digital filtering process which includes storing a sample value of a given digital signal and calculating each successive said sample value in accordance with a predetermined transfer function comprising the sum of a first proportion of a previously stored sample value added to a second proportion of the present value of said digital signal.

26. A method according to claim 25 wherein the step of low pass filtering comprises the further step of periodically sampling said digital period signals, and converting each sampled digital period signal into a digital frequency-related signal to comprise said given digital signal prior to said calculating and storing.

27. A method according to claim 26 wherein the step of controlling the effective corner frequency comprises selecting said first and second proportions in accordance with variations in said digital frequency-related signal.

* * * * *